United States Patent
Kawabata et al.

(10) Patent No.: US 11,389,951 B2
(45) Date of Patent: Jul. 19, 2022

(54) HAND MECHANISM, GRIPPING SYSTEM, AND NON-TRANSITORY STORAGE MEDIUM

(71) Applicant: THK CO., LTD., Tokyo (JP)

(72) Inventors: Shinji Kawabata, Tokyo (JP); Yoshimasa Endo, Tokyo (JP); Fumiya Koizumi, Tokyo (JP); Yoshikazu Matsuo, Tokyo (JP); Yuki Nomura, Tokyo (JP); Toshiya Watanabe, Tokyo (JP); Kenji Hidaka, Tokyo (JP)

(73) Assignee: THK CO., LTD., Tokyo (JP)

( * ) Notice: Subject to any disclaimer, the term of this patent is extended or adjusted under 35 U.S.C. 154(b) by 119 days.

(21) Appl. No.: 16/613,235

(22) PCT Filed: May 15, 2018

(86) PCT No.: PCT/JP2018/018821
§ 371 (c)(1),
(2) Date: Nov. 13, 2019

(87) PCT Pub. No.: WO2018/212205
PCT Pub. Date: Nov. 22, 2018

(65) Prior Publication Data
US 2020/0171652 A1    Jun. 4, 2020

(30) Foreign Application Priority Data

May 15, 2017 (JP) .............................. JP2017-096830
Apr. 17, 2018 (JP) .............................. JP2018-078983

(51) Int. Cl.
*B25J 9/10* (2006.01)
*B25J 15/00* (2006.01)
(Continued)

(52) U.S. Cl.
CPC ........... *B25J 9/102* (2013.01); *B25J 15/0004* (2013.01); *B25J 15/0213* (2013.01);
(Continued)

(58) Field of Classification Search
CPC ........................ B25J 15/0004; B25J 15/0009; B25J 15/0213; B25J 15/086; B25J 15/10;
(Continued)

(56) References Cited

U.S. PATENT DOCUMENTS 4,273,506 A * 6/1981 Thomson ................. B25J 9/046
                                                          294/106
4,858,974 A * 8/1989 Stannek ............... B25J 15/0616
                                                          294/2
(Continued)

FOREIGN PATENT DOCUMENTS

EP       1340700 A1 *  9/2003  ............. B65G 61/00
JP       9-323281 A    12/1997
(Continued)

OTHER PUBLICATIONS

International Search Report dated Aug. 7, 2018, issued in counterpart International Application No. PCT/JP2018/018821, with English Translation. (4 pages).
(Continued)

*Primary Examiner* — Dean J Kramer
(74) *Attorney, Agent, or Firm* — WHDA, LLP

(57) ABSTRACT

A hand mechanism grips an object more favorably, regardless of the attitude and surrounding conditions of the object. When an object is to be gripped by a hand mechanism having three or more finger portions, at least one finger portion among the three or more finger portions functions as a state-altering finger portion for altering the attitude or the position of the object while contacting the object, and at least two finger portions among the finger portions other
(Continued)

than the finger portion functioning as the state-altering finger portion function as gripping finger portions for gripping the object in a state where the attitude or the position has been altered by the state-altering finger portion.

12 Claims, 25 Drawing Sheets

(51) Int. Cl.
  *B25J 15/10* (2006.01)
  *B25J 19/02* (2006.01)
  *B25J 15/08* (2006.01)
  *B25J 15/12* (2006.01)
  *B25J 15/02* (2006.01)
(52) U.S. Cl.
  CPC ........... *B25J 15/086* (2013.01); *B25J 15/103* (2013.01); *B25J 15/12* (2013.01); *B25J 19/02* (2013.01)
(58) Field of Classification Search
  CPC ........ B25J 15/103; B25J 9/102; B25J 13/081; B25J 13/082; B25J 13/084; B25J 19/02
  USPC .......................................................... 294/106
  See application file for complete search history.

(56) References Cited

U.S. PATENT DOCUMENTS

| | | | | |
|---|---|---|---|---|
| 8,132,835 | B2* | 3/2012 | Ban | B25J 15/0616 294/2 |
| 8,452,452 | B2* | 5/2013 | Kondo | B25J 15/0009 700/260 |
| 2001/0020197 | A1* | 9/2001 | Nakano | B65G 1/0435 700/215 |
| 2006/0145494 | A1 | 7/2006 | Nihei et al. | |
| 2007/0241577 | A1* | 10/2007 | Waldorf | B25B 5/087 294/203 |
| 2010/0259057 | A1 | 10/2010 | Madhani | |
| 2011/0192247 | A1* | 8/2011 | Matsukuma | B25J 9/104 74/490.03 |
| 2011/0265311 | A1* | 11/2011 | Kondo | B25J 9/0084 29/559 |
| 2012/0059517 | A1 | 3/2012 | Nomura | |
| 2013/0057004 | A1 | 3/2013 | Murata et al. | |
| 2014/0197652 | A1* | 7/2014 | Wang | B25J 15/0616 294/185 |
| 2016/0114485 | A1 | 4/2016 | Nomura | |
| 2020/0147814 | A1* | 5/2020 | Hirahara | G07F 11/42 |

FOREIGN PATENT DOCUMENTS

| | | |
|---|---|---|
| JP | 2006-102920 A | 4/2006 |
| JP | 2010-64155 A | 3/2010 |
| JP | 2010-240834 A | 10/2010 |
| JP | 2012-55999 A | 3/2012 |
| JP | 2014-97555 A | 5/2014 |
| JP | 2015-533669 A | 11/2015 |
| WO | 2004/028753 A2 | 4/2004 |
| WO | 2011/118646 A1 | 9/2011 |
| WO | 2014/074840 A1 | 5/2014 |

OTHER PUBLICATIONS

Office Action dated Dec. 16, 2021, issued in counterpart Korean Application No. 10-2019-7036449 (12 pages; w/English machine translation).

* cited by examiner

[Fig. 1]
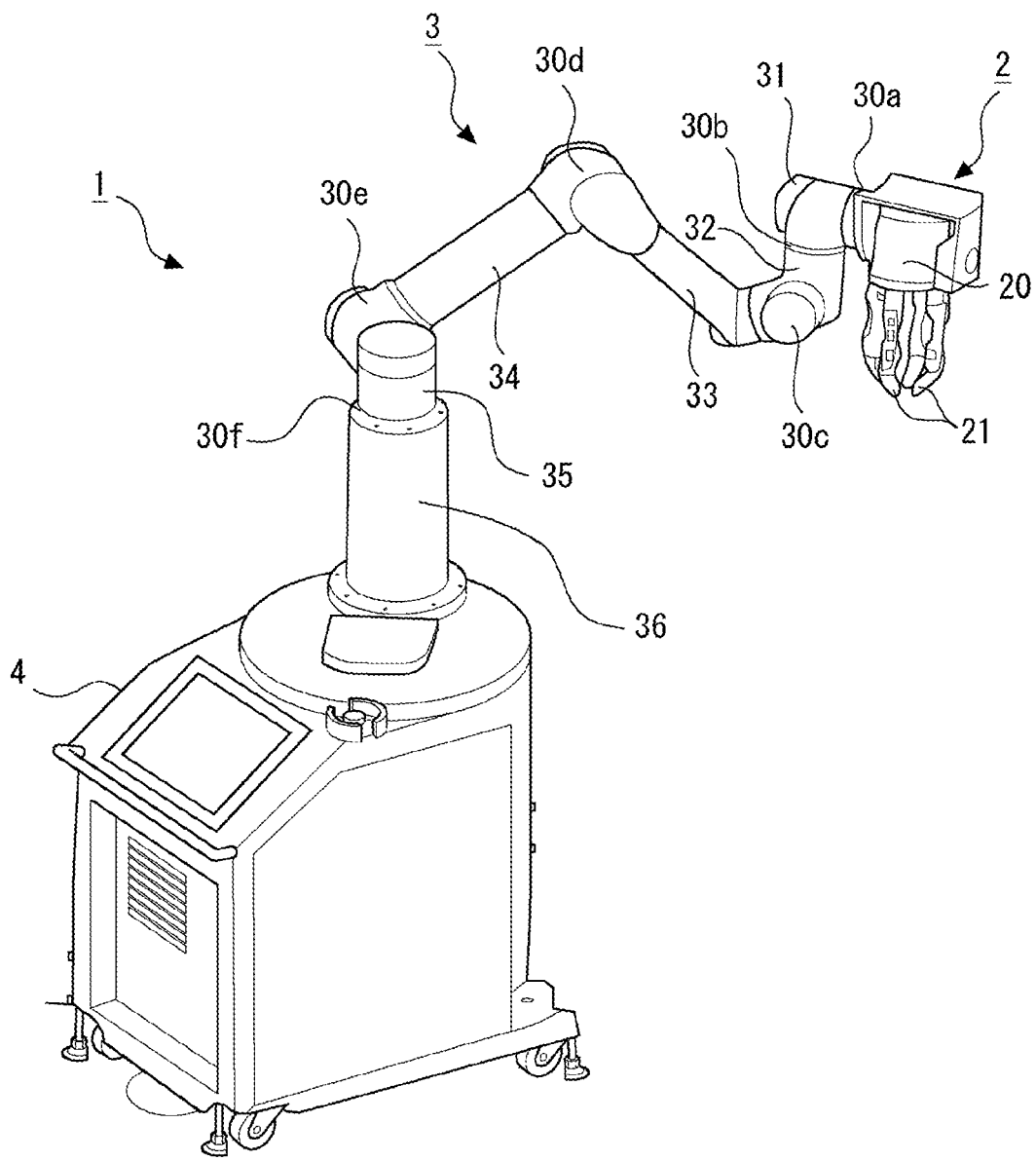

[Fig. 2]
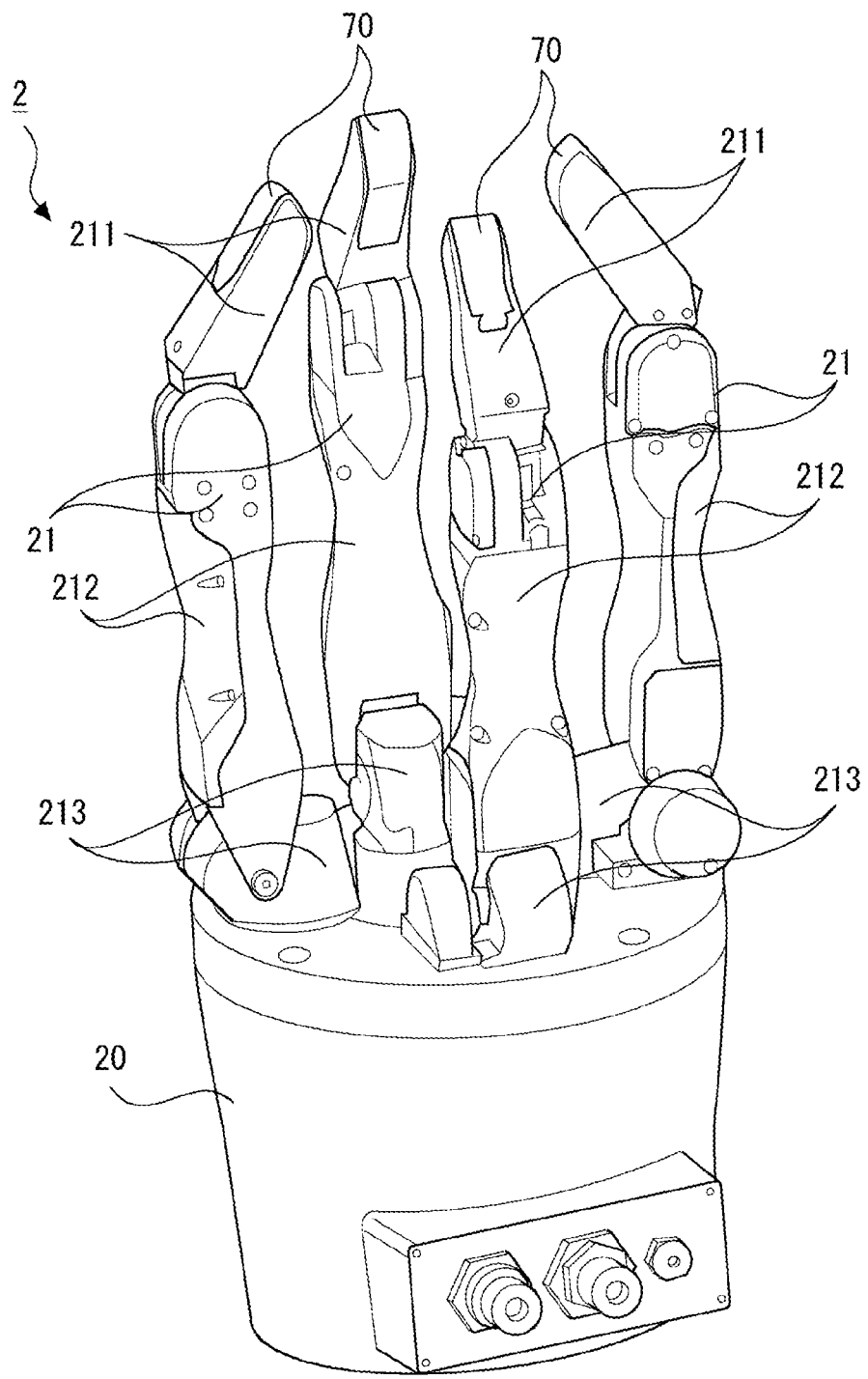

[Fig. 3]
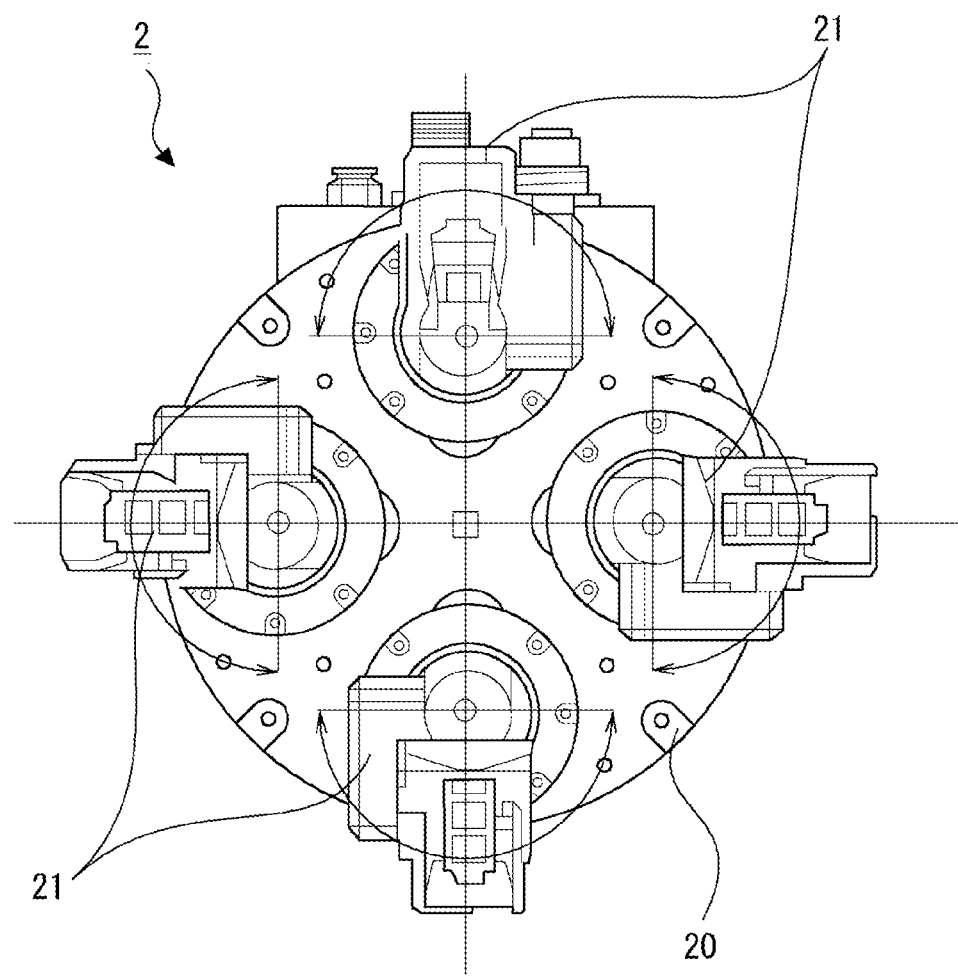

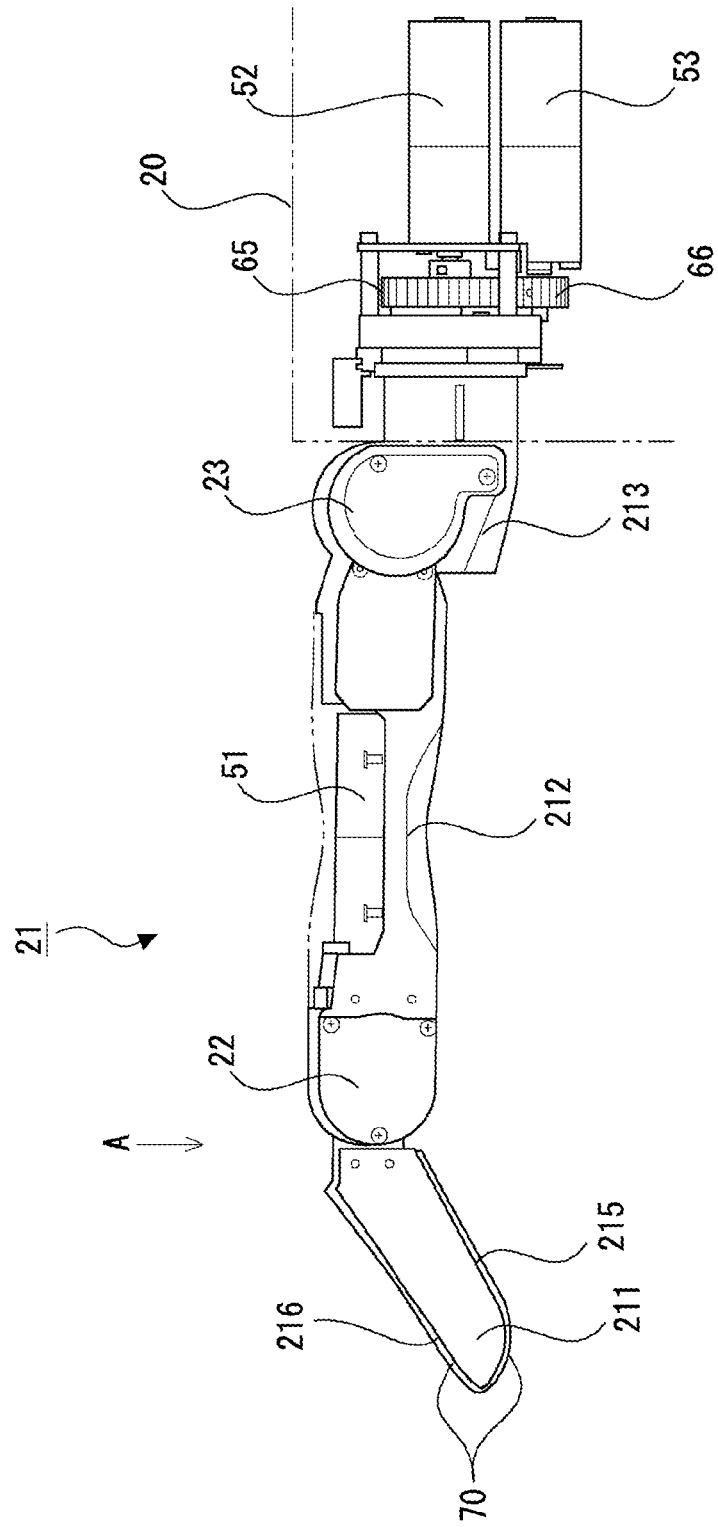
[Fig. 4]

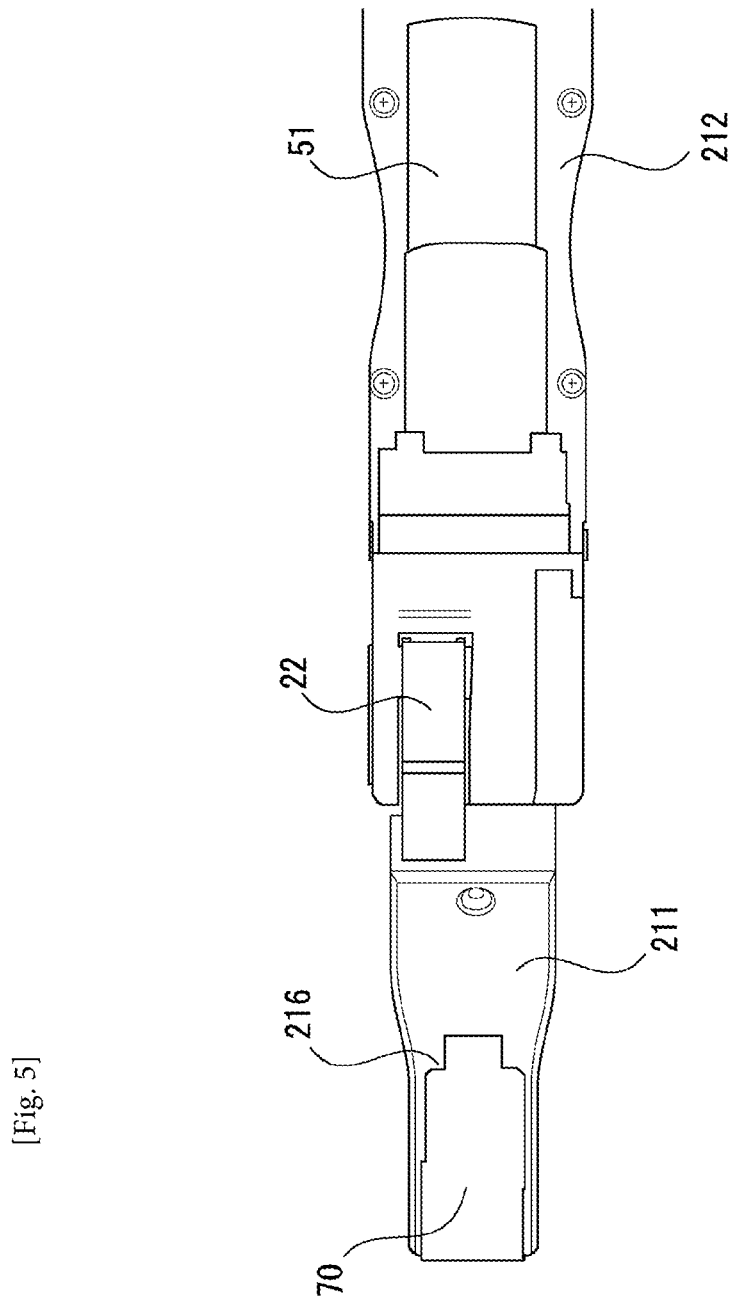
[Fig. 5]

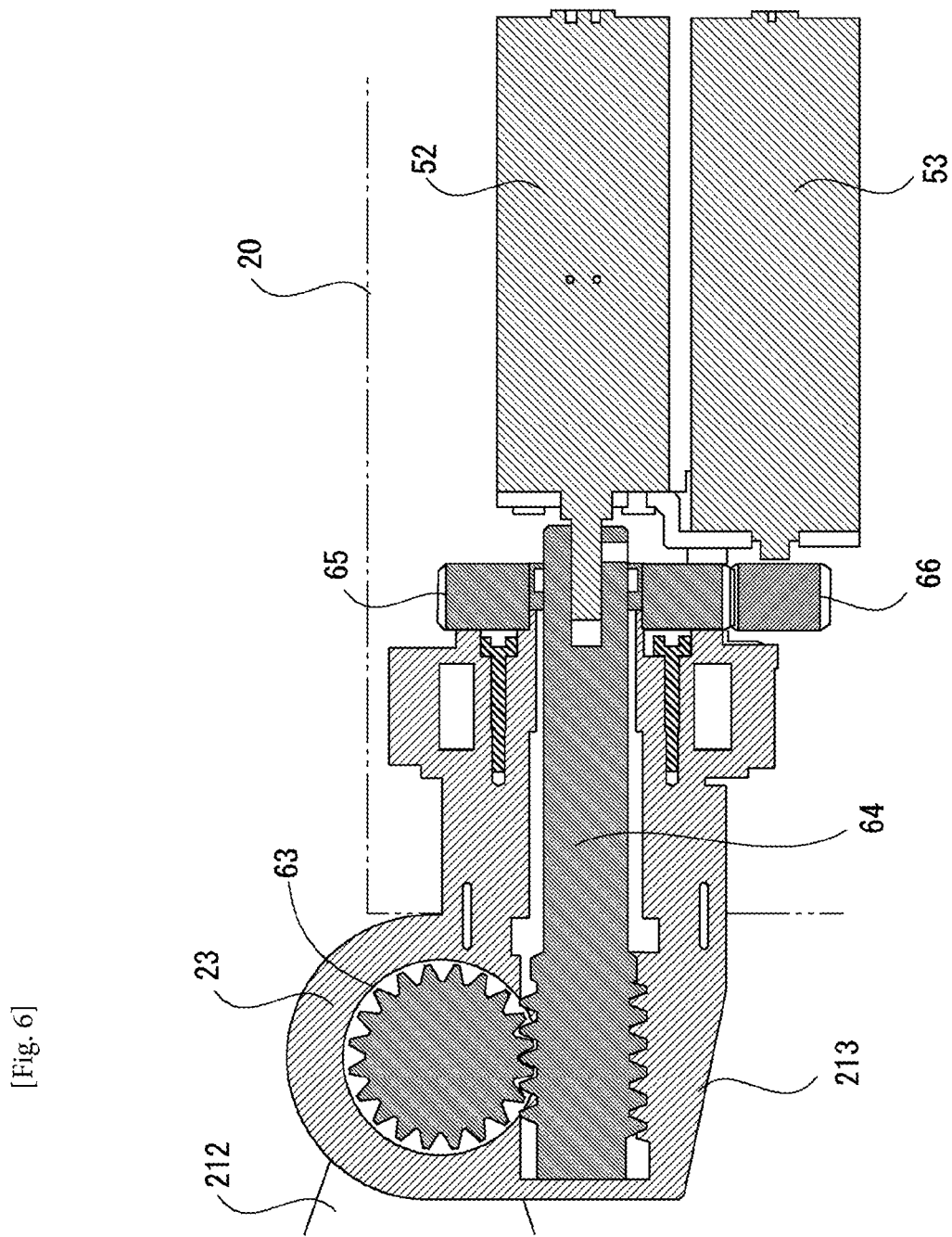
[Fig. 6]

[Fig. 7]
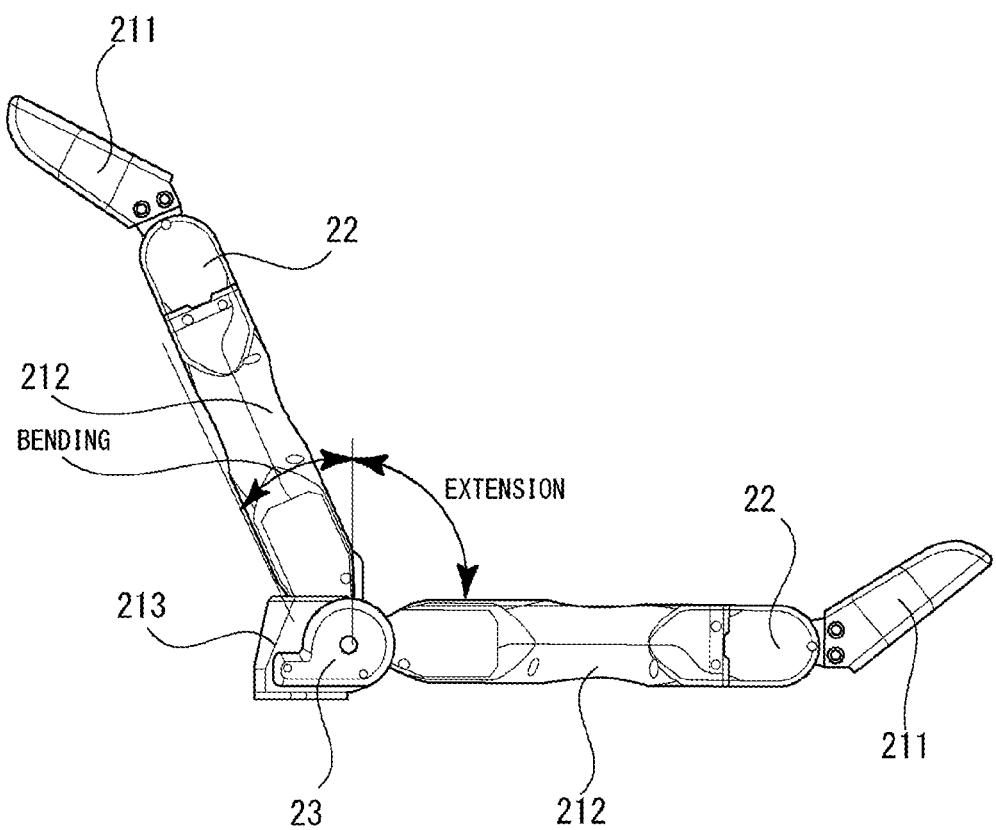

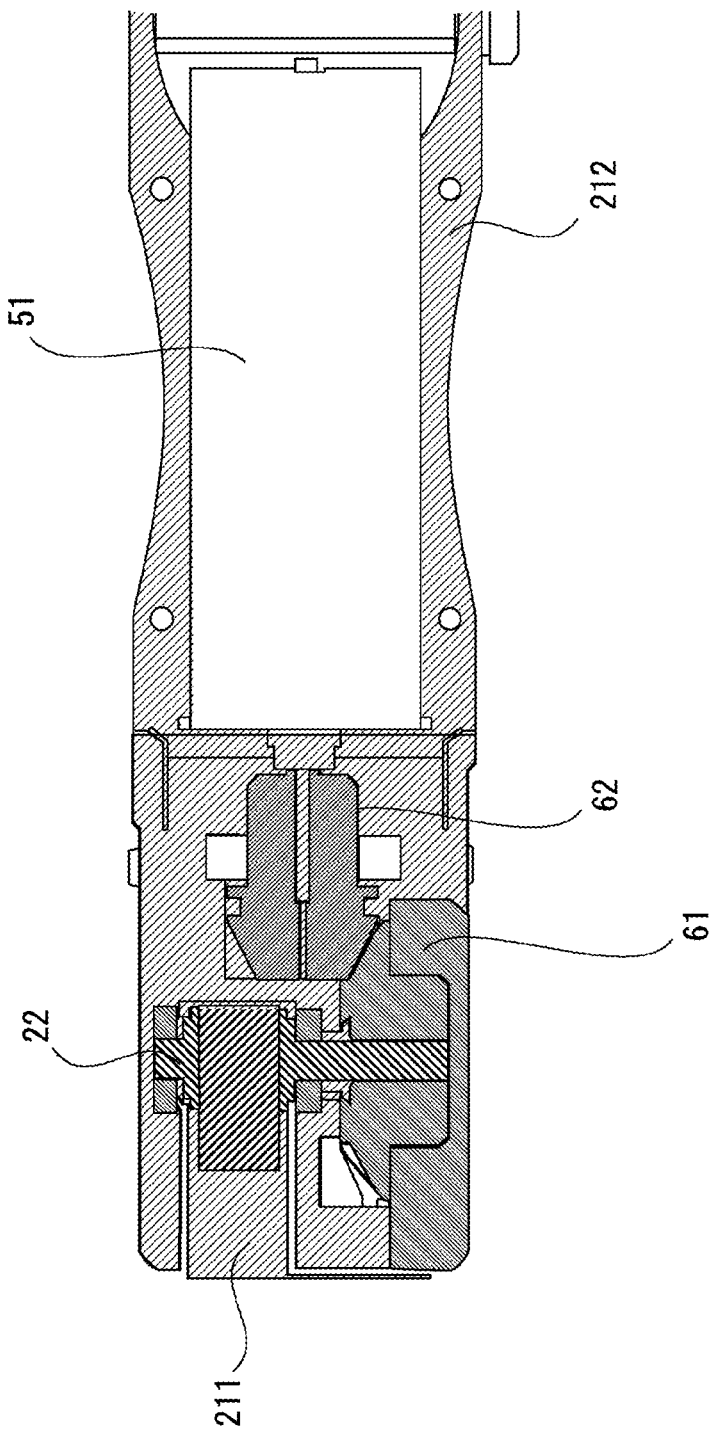
[Fig. 8]

[Fig. 9]
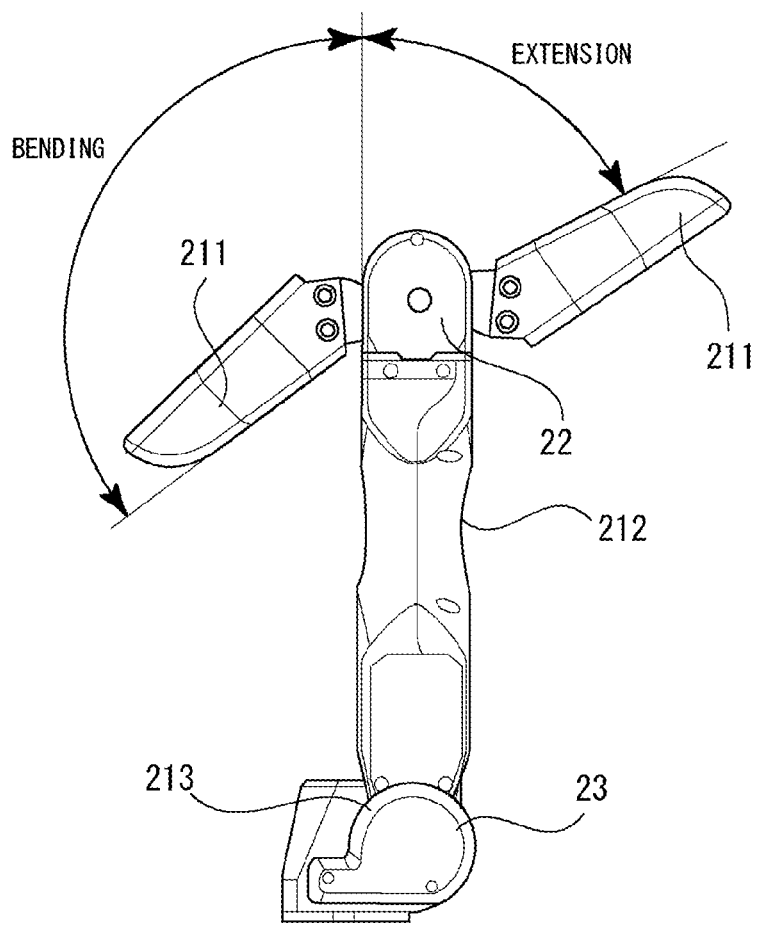

[Fig. 10]
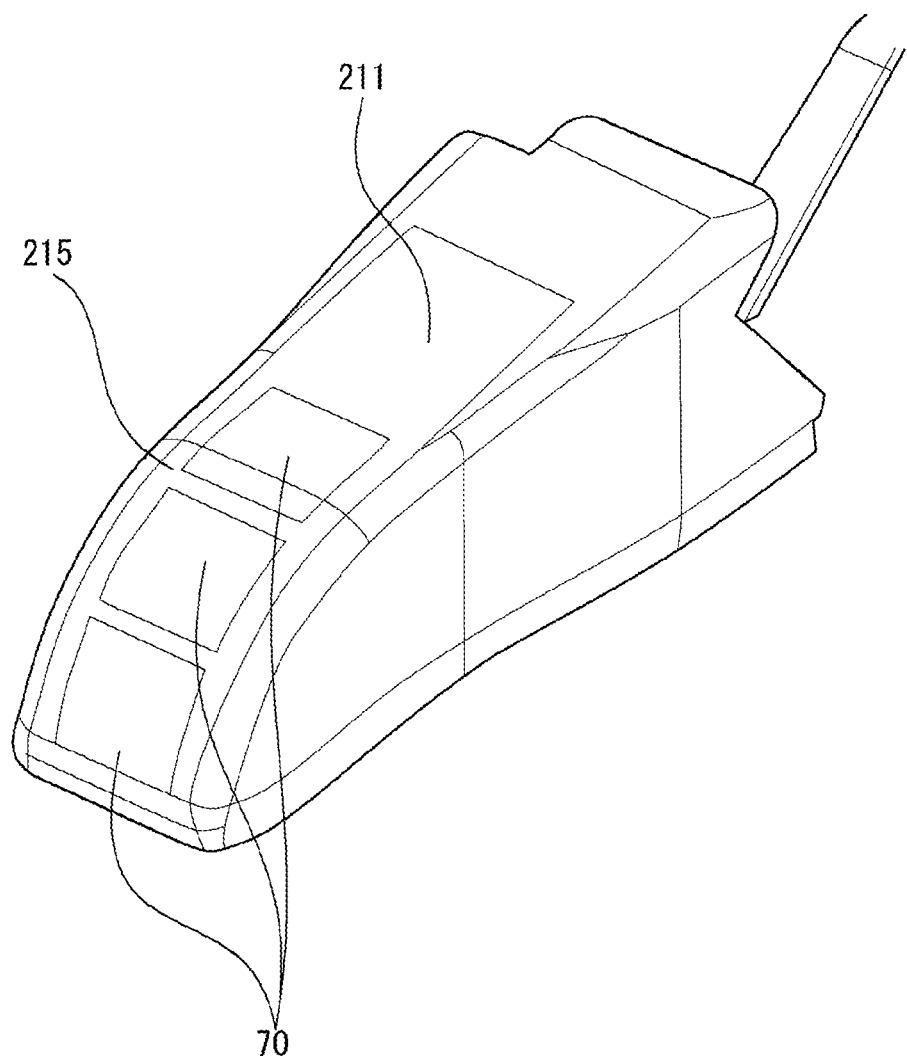

[Fig. 11]
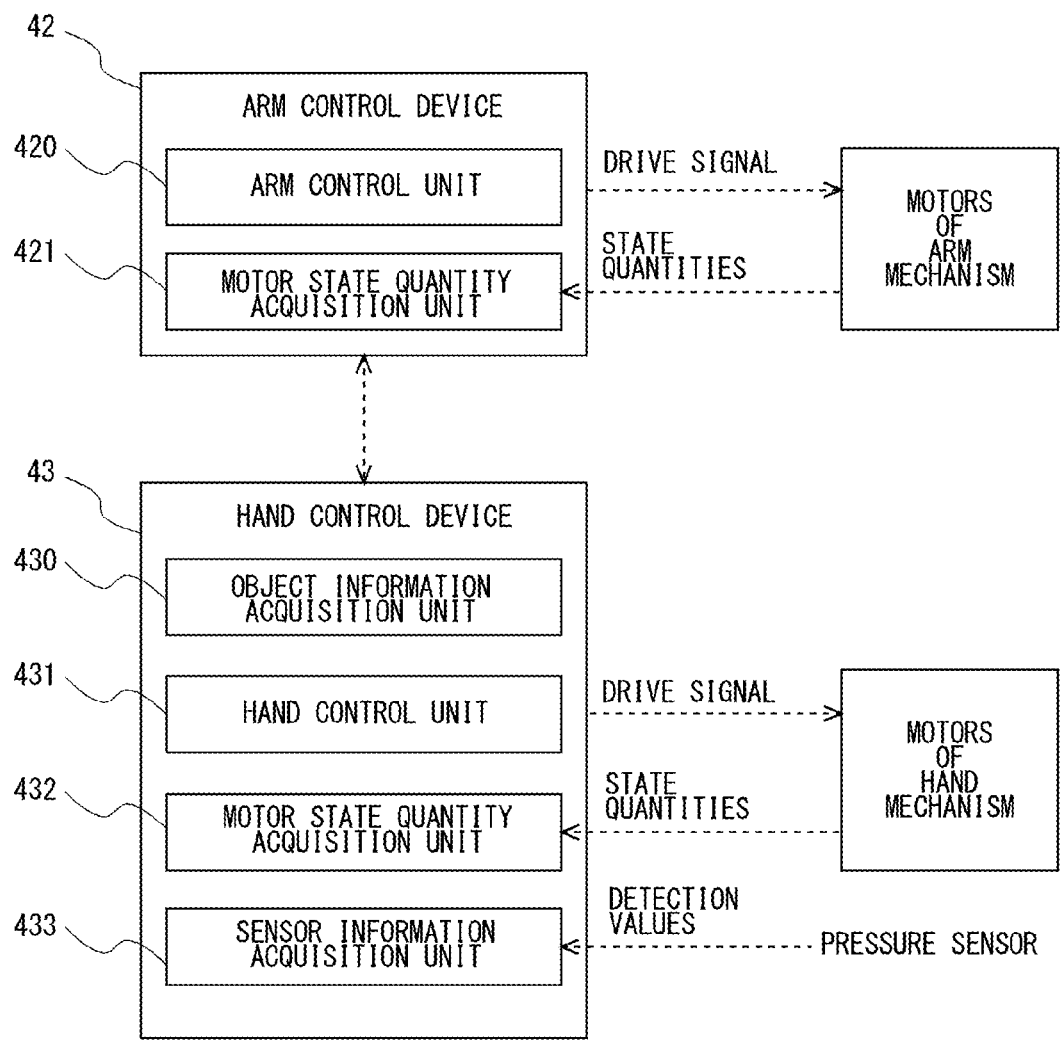

[Fig. 12]
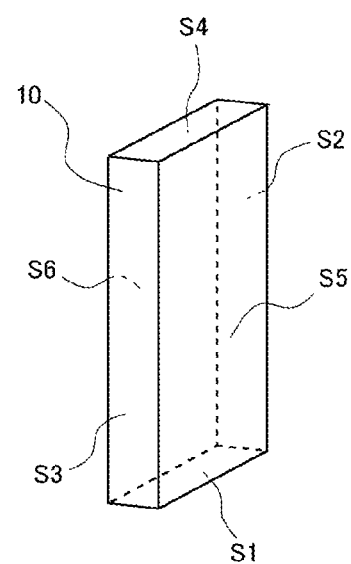

[Fig. 13]
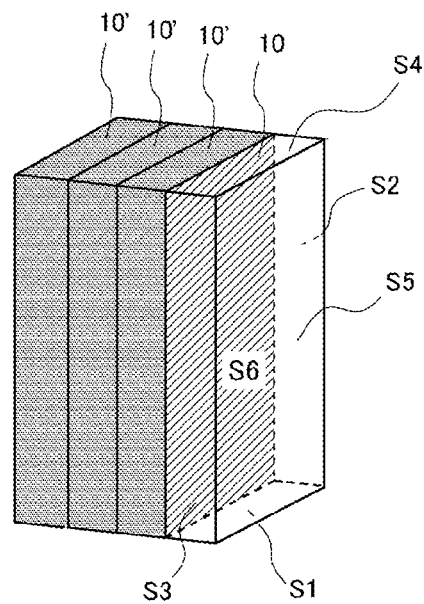

[Fig. 14]
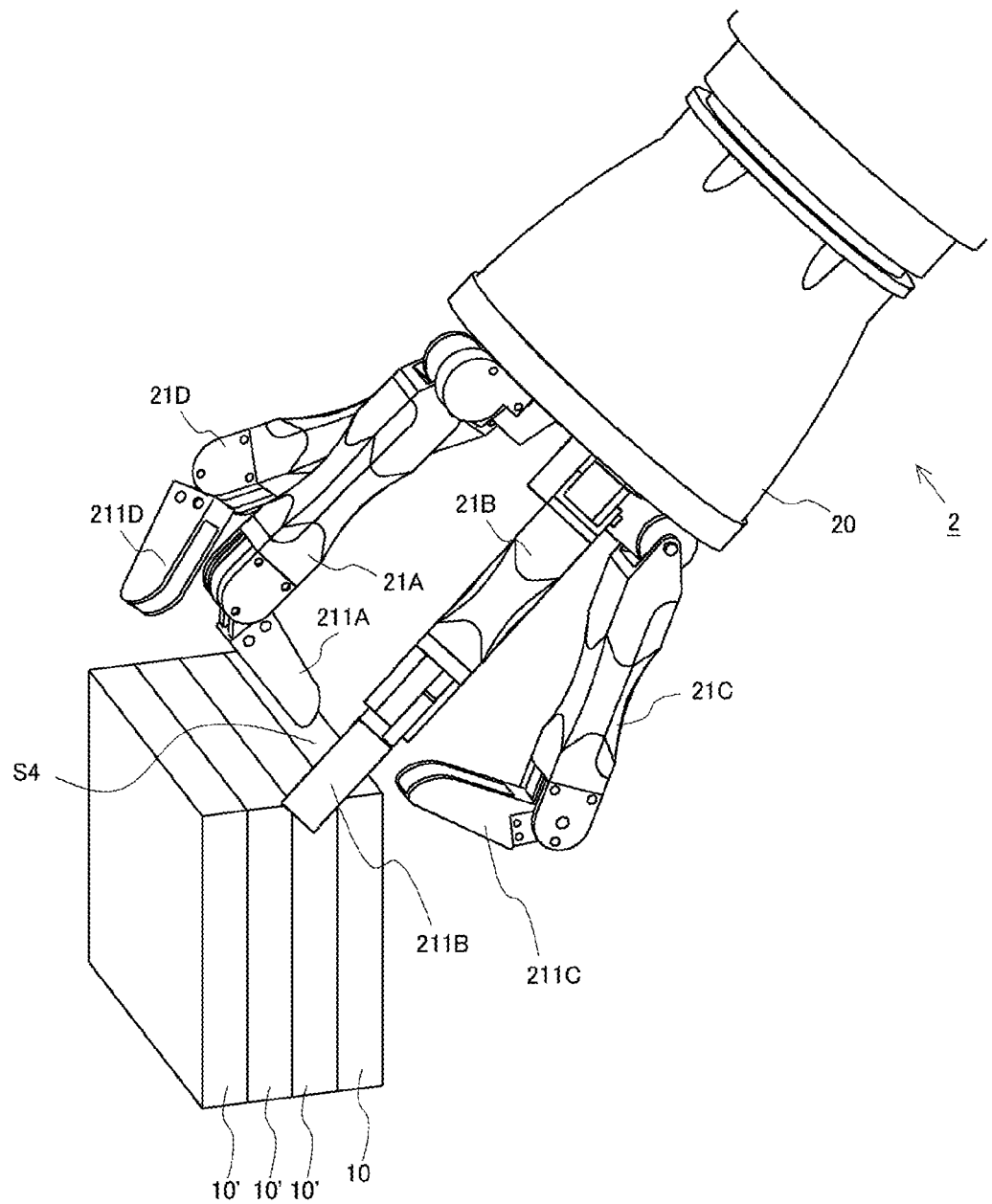

[Fig. 15]
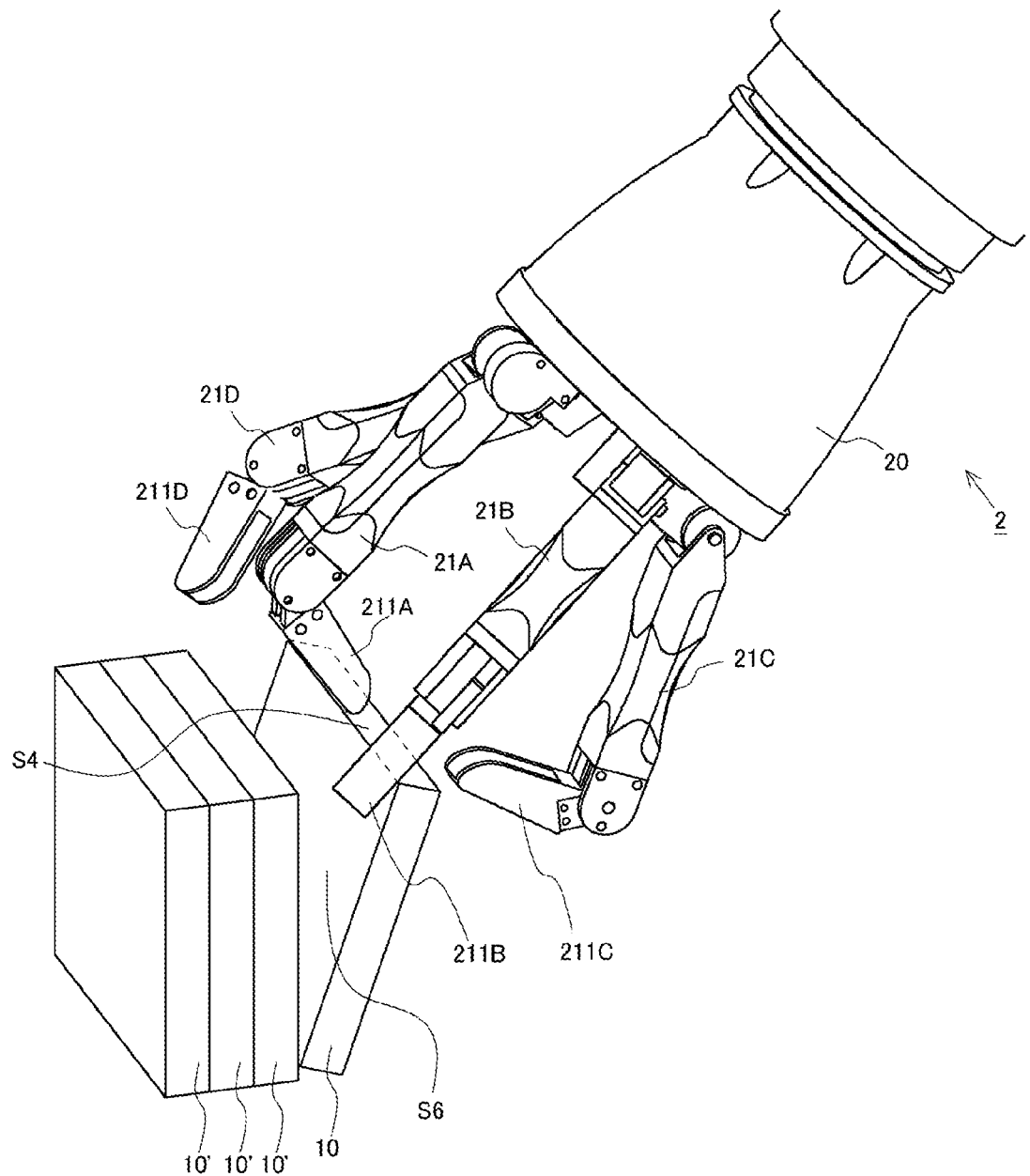

[Fig. 16]
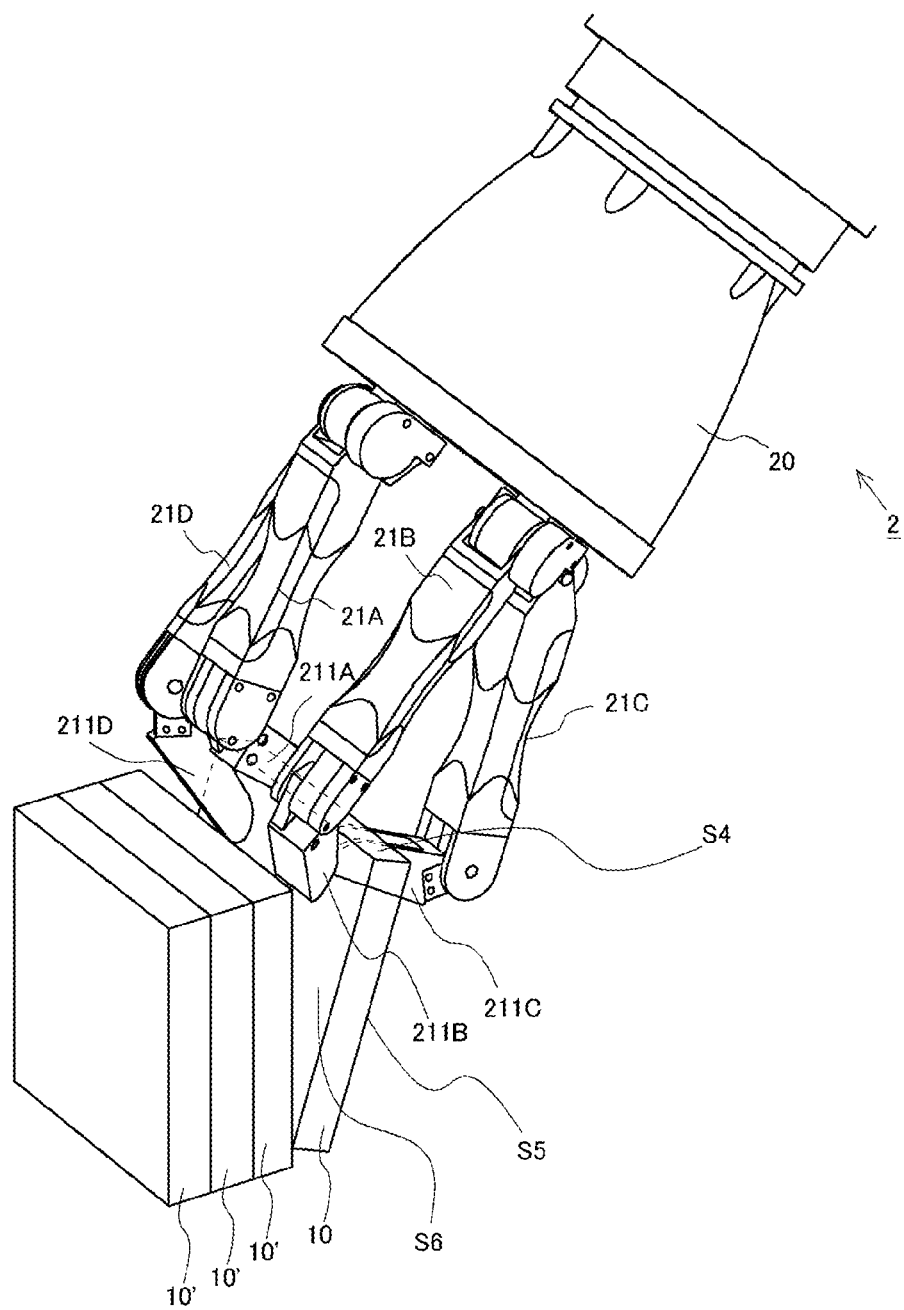

[Fig. 17]
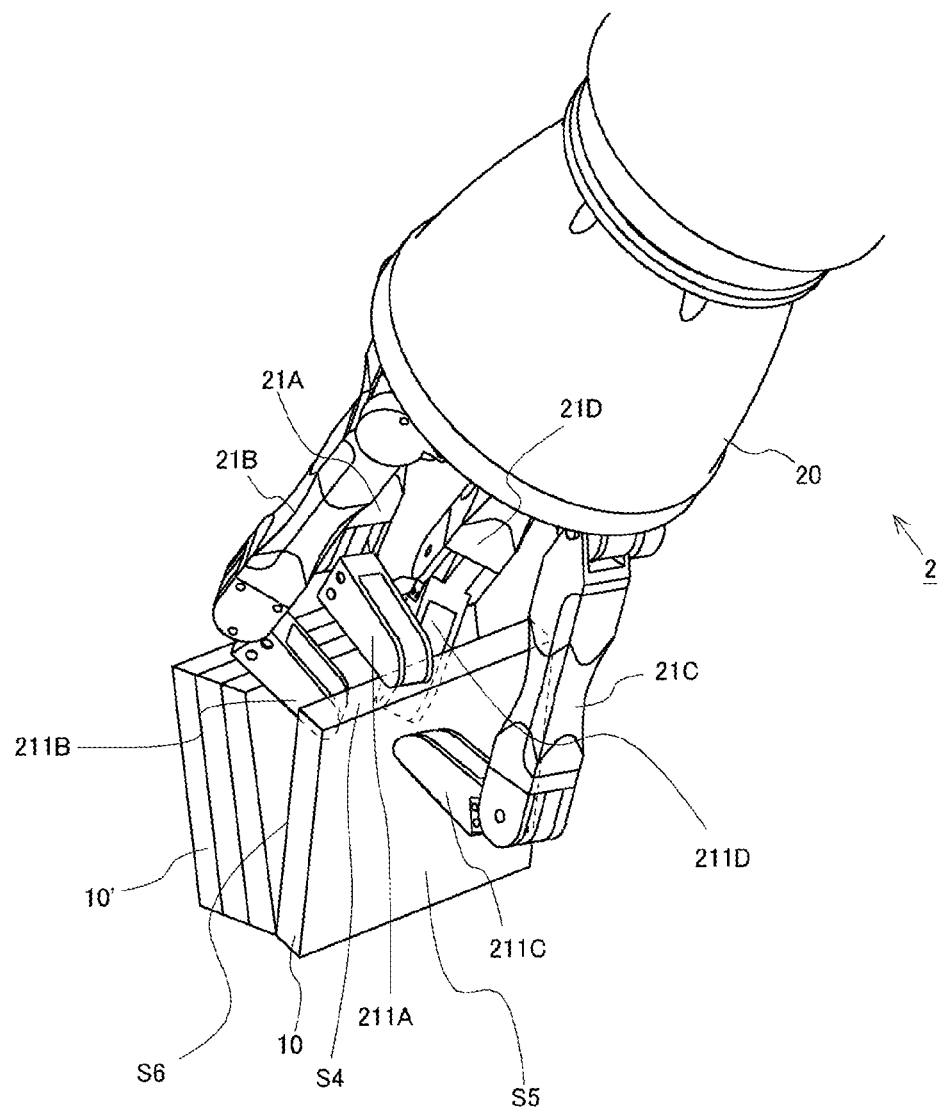

[Fig. 18]
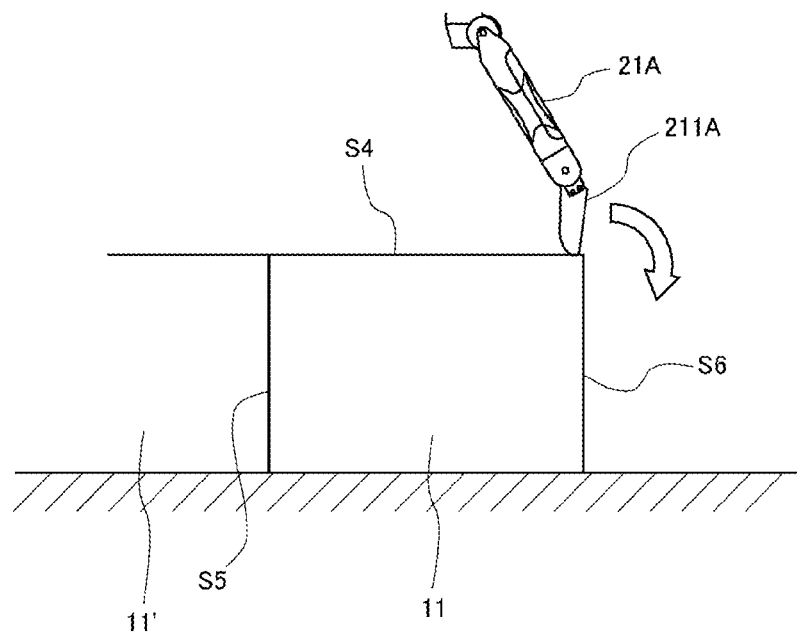

[Fig. 19]
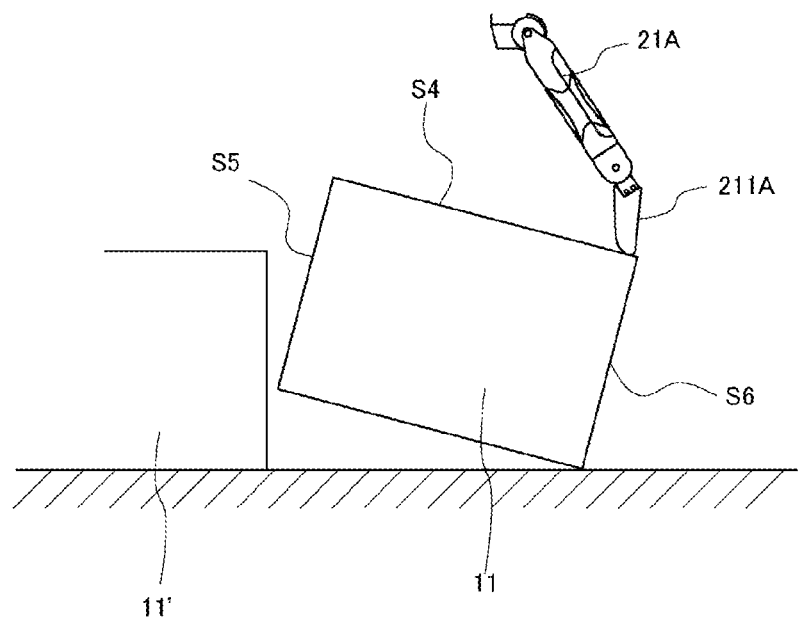

[Fig. 20]
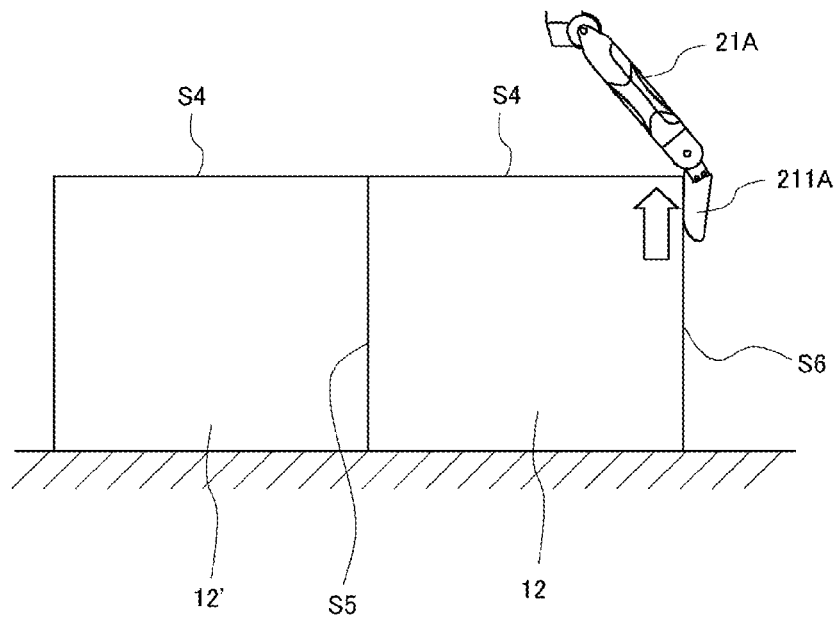

[Fig. 21]
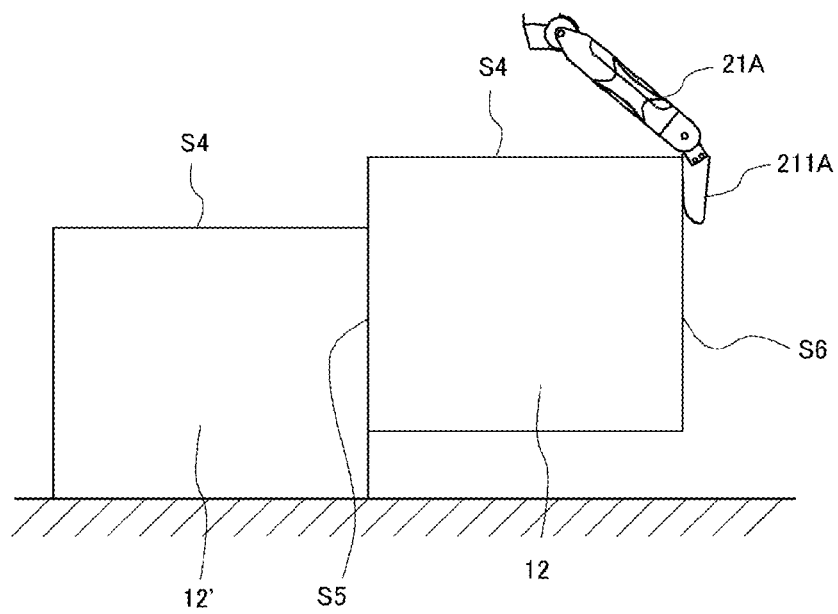

[Fig. 22]
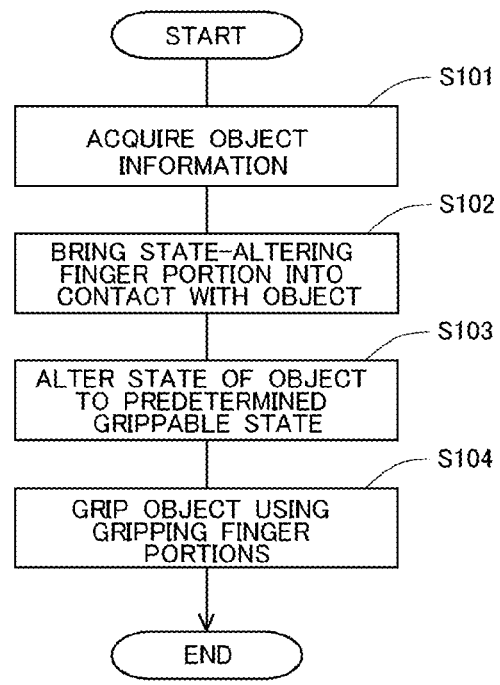

[Fig. 23]
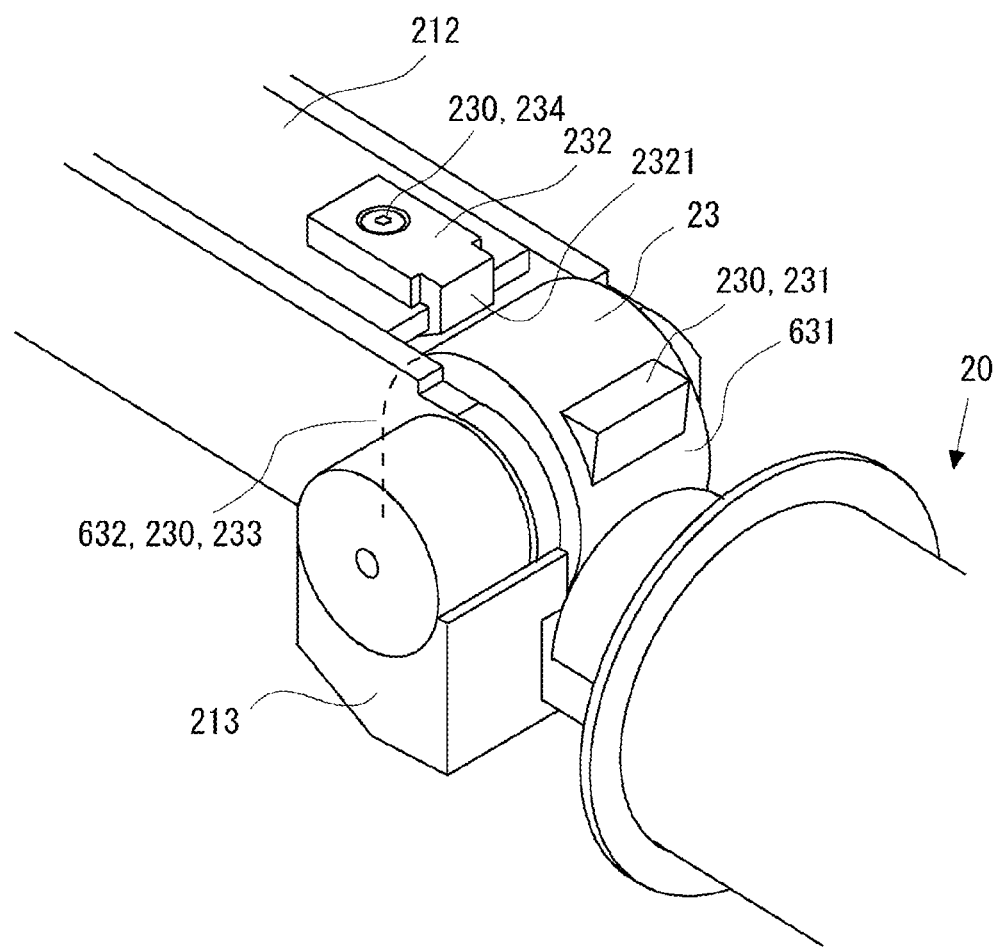

[Fig. 24]
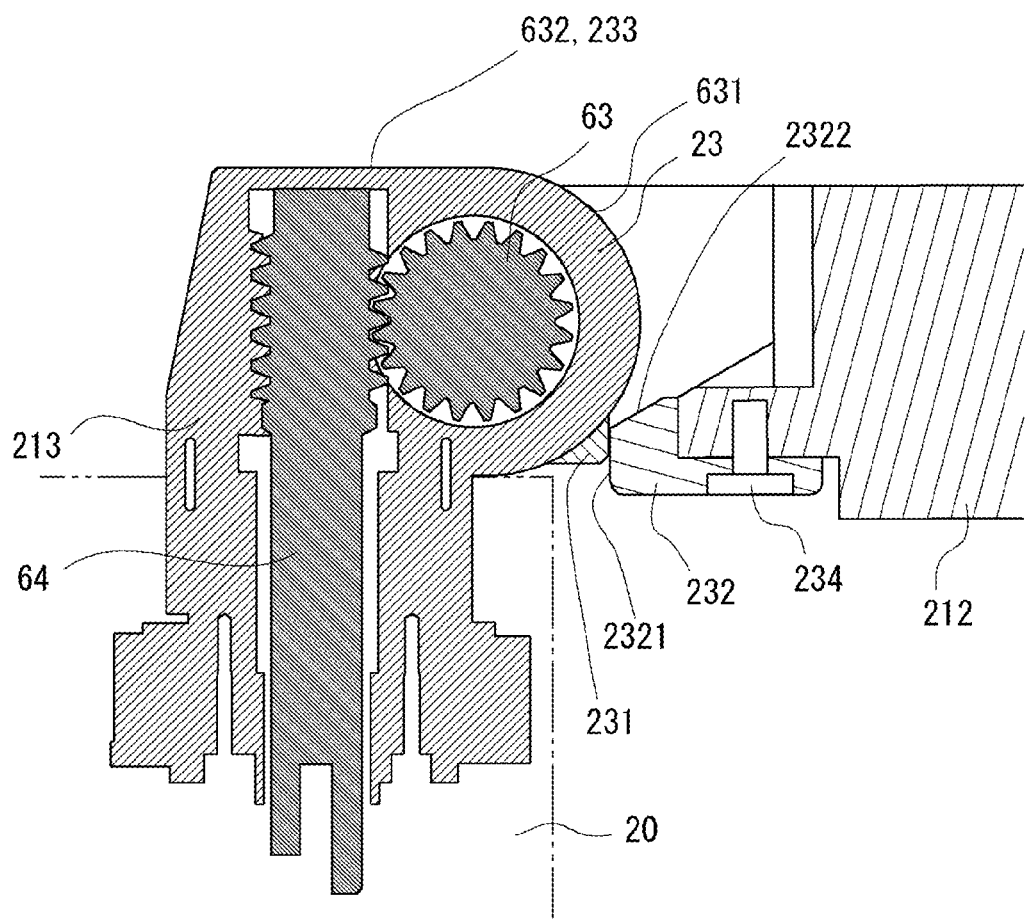

[Fig. 25]
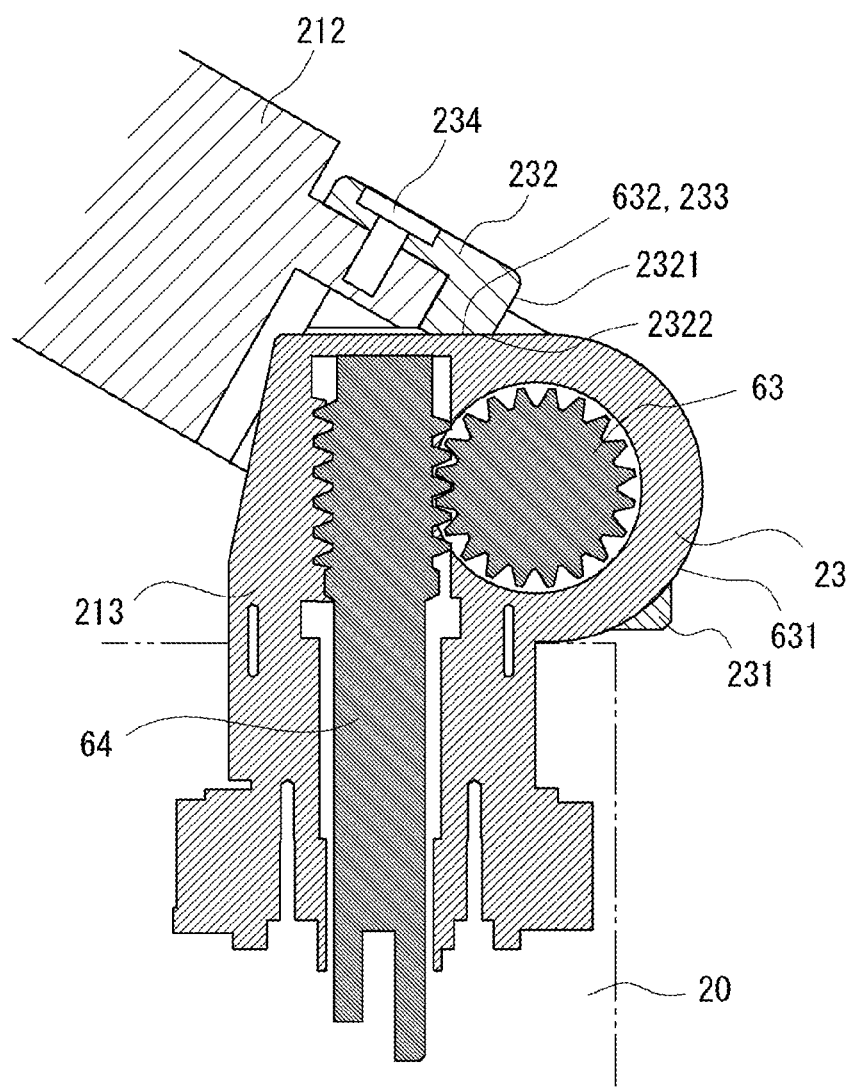

HAND MECHANISM, GRIPPING SYSTEM, AND NON-TRANSITORY STORAGE MEDIUM

TECHNICAL FIELD

The present invention relates to a hand mechanism, a gripping system, and a non-transitory storage medium for gripping an object using a plurality of finger portions.

BACKGROUND ART

Hand mechanisms attached to a robot arm or the like in order to grip an object using a plurality of finger portions have been developed in the prior art. PTL 1, for example, discloses a hand mechanism having three finger portions (fingers). In the hand mechanism of PTL 1, the three finger portions have identical structures. Further, in the hand mechanism of PTL 1, a plate member is provided on a tip end portion of each finger portion such that a free end thereof projects from the tip end portion. By configuring the finger portion in this fashion, when an object placed on a flat surface is to be gripped by the hand mechanism, with the plate member of the finger portion inserted between the flat surface and the object, the object can be gripped by the finger portion.

CITATION LIST

Patent Literature

[PTL 1] Japanese Translation of PCT Application No. 2015-533669

SUMMARY OF INVENTION

Technical Problem

Typically, when an object is to be gripped by a hand mechanism, the object must be placed in advance so that the attitude and surrounding conditions of the object are suitable for the object to be gripped by the hand mechanism. Considering that a hand mechanism is used with respect to various objects and under various conditions, however, it is desirable to minimize limitations caused by the placement state and placement conditions of the object.

The present invention has been devised in consideration of the problem described above, and an object thereof is to provide a technique with which an object can be gripped more favorably by a hand mechanism, regardless of the attitude and surrounding conditions of the object.

Solution to Problem

A hand mechanism according to the present invention includes three or more finger portions so that when an object is to be gripped, at least one finger portion among the three or more finger portions functions as a state-altering finger portion for altering the attitude and/or the position of the object while contacting the object, and at least two finger portions among the finger portions other than the finger portion functioning as the state-altering finger portion function as gripping finger portions for gripping the object in a state where the attitude and/or the position has been altered by the state-altering finger portion.

Advantageous Effects of Invention

According to the present invention, the hand mechanism can grip the object more favorably, regardless of the attitude and surrounding conditions of the object.

BRIEF DESCRIPTION OF DRAWINGS

FIG. 1 is a schematic view showing a configuration of a robot arm according to an embodiment.

FIG. 2 is a perspective view of a hand mechanism according to this embodiment.

FIG. 3 is a top view of the hand mechanism according to this embodiment.

FIG. 4 is a side view of a finger portion of the hand mechanism according to this embodiment.

FIG. 5 is a view showing a tip end portion side of the finger portion of the hand mechanism according to this embodiment from the direction of an arrow A in FIG. 4.

FIG. 6 is a view showing an internal structure of a part of a base portion near a connecting portion connected to the finger portion and internal structures of a base end portion and a second joint portion of the finger portion on the hand mechanism according to this embodiment.

FIG. 7 is a view showing a movement range of the second joint portion of the finger portion on the hand mechanism according to this embodiment.

FIG. 8 is a view showing internal structures of a first joint portion and a second finger link portion of the finger portion on the hand mechanism according to this embodiment.

FIG. 9 is a view showing a movement range of the first joint portion of the finger portion on the hand mechanism according to this embodiment.

FIG. 10 is a view showing an arrangement of pressure sensors on a first link portion of the finger portion on the hand mechanism according to this embodiment.

FIG. 11 is a block diagram showing respective function units included in an arm control device and a hand control device according to this embodiment.

FIG. 12 is a view showing an example of the shape of an object that is gripped by the hand mechanism.

FIG. 13 is a view showing a state in which a plurality of objects are arranged side by side.

FIG. 14 is a first view showing an operation performed by a first finger portion of the hand mechanism according to this embodiment to alter the attitude of the object.

FIG. 15 is a second view showing the operation performed by a first finger portion of the hand mechanism according to this embodiment to alter the attitude of the object.

FIG. 16 is a first view showing a state in which the object is gripped by a second finger portion, a third finger portion, and a fourth finger portion of the hand mechanism according to this embodiment.

FIG. 17 is a second view showing a state in which the object is gripped by the second finger portion, the third finger portion, and the fourth finger portion of the hand mechanism according to this embodiment.

FIG. 18 is a first view showing a first other example of the operation of the hand mechanism according to this embodiment.

FIG. 19 is a second view showing the first other example of the operation of the hand mechanism according to this embodiment.

FIG. 20 is a first view showing a second other example of the operation of the hand mechanism according to this embodiment.

FIG. 21 is a second view showing the second other example of the operation of the hand mechanism according to this embodiment.

FIG. 22 is a flowchart showing a control flow executed when an object is gripped by the hand mechanism according to this embodiment.

FIG. 23 is a schematic view showing a configuration of stoppers according to this embodiment.

FIG. 24 is a sectional view of the vicinity of the second joint portion according to this embodiment when the second joint portion is maximally extended.

FIG. 25 is a sectional view of the vicinity of the second joint portion according to this embodiment when the second joint portion is maximally bent.

DESCRIPTION OF EMBODIMENTS

A hand mechanism according to the present invention includes three or more finger portions. Here, when an object is to be gripped by the hand mechanism, in order to clamp the object with the finger portions, a predetermined gripping location, i.e. the part of the object with which the fingers are to be brought into contact, must be exposed so that the finger portions can contact the gripping location. However, under conditions in which an item that causes an obstruction during gripping of the object, such as a wall surface of a container housing the object or another object in a case where a plurality of objects are arranged side by side in mutual contact, is placed nearby, the predetermined gripping location of the object may not be exposed so as to be contactable by the finger portions. In such cases, if the object is left as is, it is difficult for the hand mechanism to grip the object. Even in this case, however, by altering the attitude or position of the object so as to increase the interval between the object and the obstruction, the predetermined gripping location of the object can be exposed. Then, by bringing the finger portions into contact with the predetermined gripping location of the object and clamping the object with the finger portions when the finger portions are in a state where the gripping location is exposed, the object can be gripped by the hand mechanism.

Hence, in the hand mechanism according to the present invention, when an object is to be gripped, at least one finger portion among the three or more finger portions functions as a state-altering finger portion for altering the attitude or the position of the object while contacting the object. The state-altering finger portion can be brought into contact with the object even when the predetermined gripping location of the object is not exposed so as to be contactable by the finger portions. Further, by bringing the state-altering finger portion into contact with the object, the attitude or the position of the object can be altered by the state finger portion. As noted above, by altering the attitude or the position of the object so as to increase the interval between the object and the obstruction, the predetermined gripping location of the object can be exposed.

Further, in the hand mechanism according to the present invention, when an object is to be gripped, at least two finger portions, among the finger portions other than the finger portion functioning as the state-altering finger portion, function as gripping finger portions for gripping the object in a state where the attitude or the position thereof has been altered by the state-altering finger portion. In other words, when an object is to be gripped, the gripping finger portions contact the predetermined gripping location of the object, which has been exposed by altering the attitude or the position of the object using the state-altering finger portion. The object is then gripped by the gripping finger portions.

By providing the hand mechanism with the state-altering finger portion and the gripping finger portions, as described above, the hand mechanism can grip an object regardless of the attitude and the surrounding conditions of the object.

Embodiment

A specific embodiment of the present invention will be described below on the basis of the figures. Unless specified otherwise, the technical scope of the invention is not limited only to the dimensions, materials, shapes, relative arrangements, and so on of the constituent components described in this embodiment.

Here, a case in which the hand mechanism and gripping system according to the present invention are applied to a robot arm will be described. FIG. 1 is a schematic view showing a configuration of the robot arm according to this embodiment. A robot arm 1 includes a hand mechanism 2, an arm mechanism 3, and a support portion 4. The hand mechanism 2 is attached to one end of the arm mechanism 3. Further, the other end of the arm mechanism 3 is attached to the support portion 4. The hand mechanism 2 includes a base portion 20 connected to the arm mechanism 3, and four finger portions 21 provided on the base portion 20. Note that the configuration of the hand mechanism 2 will be described in detail below.

<Arm Mechanism>

The arm mechanism 3 includes a first arm link portion 31, a second arm link portion 32, a third arm link portion 33, a fourth arm link portion 34, a fifth arm link portion 35, and a connecting member 36. The base portion 20 of the hand mechanism 2 is connected to a first joint portion 30a formed on one end side of the first arm link portion 31 of the arm mechanism 3. A motor (not shown) for rotating the hand mechanism 2 relative to the first arm link portion 31 about the first arm link portion 31 is provided in the first joint portion 30a. The other end side of the first arm link portion 31 is connected to one end side of the second arm link portion 32 by a second joint portion 30b. The first arm link portion 31 and the second arm link portion 32 are connected so that respective central axes thereof intersect perpendicularly. A motor (not shown) for rotating the first arm link portion 31 relative to the second arm link portion 32 about the other end side thereof is provided in the second joint portion 30b. Further, the other end side of the second arm link portion 32 is connected to one end side of the third arm link portion 33 by a third joint portion 30c. A motor (not shown) for rotating the second arm link portion 32 relative to the third arm link portion 33 is provided in the third joint portion 30c.

Similarly, the other end side of the third arm link portion 33 is connected to one end side of the fourth arm link portion 34 by a fourth joint portion 30d. Furthermore, the other end side of the fourth arm link portion 34 is connected to the fifth arm link portion 35 by a fifth joint portion 30e. A motor (not shown) for rotating the third arm link portion 33 relative to the fourth arm link portion 34 is provided in the fourth joint portion 30d. Moreover, a motor (not shown) for rotating the fourth arm link portion 34 relative to the fifth arm link portion 35 is provided in the fifth joint portion 30e. Further, the fifth arm link portion 35 is connected to the connecting member 36, which is disposed to extend vertically from the support portion 4, by a sixth joint portion 30f. The fifth arm link portion 35 and the connecting member 36 are connected so that respective central axes thereof are coaxial. A motor (not shown) for rotating the fifth arm link portion 35 about the fifth arm link portion 35 and the connecting member 36 is provided in the sixth joint portion 30f. By configuring the arm mechanism 3 in this manner, the arm mechanism 3 can be realized as a mechanism having six degrees of freedom, for example.

<Hand Mechanism>

Next, the configuration of the hand mechanism 2 will be described on the basis of FIGS. 2 to 10. FIG. 2 is a perspective view of the hand mechanism 2, and FIG. 3 is a top view of the hand mechanism 2. Note that in FIG. 3, arrows represent rotation ranges of the respective finger portions 21. As shown in FIGS. 2 and 3, in the hand mechanism 2, the four finger portions 21 are disposed on the base portion 20 at equal angular intervals (more specifically, at 90 deg intervals) on a circumference centering on a longitudinal direction (a perpendicular direction to the paper surface in FIG. 3) axis of the hand mechanism 2. Further, the four finger portions 21 all have identical structures and identical lengths. Note, however, that the operations of the respective finger portions 21 are controlled independently.

FIGS. 4 to 10 are views illustrating the configuration of one finger portion 21 of the hand mechanism 2 and a driving mechanism thereof. FIG. 4 is a side view of the finger portion 21. Note that in FIG. 4, the base portion 20 is depicted in a see-through state so that the part of the internal structure of the finger portion 21 positioned inside the base portion 20 can also be seen. Further, FIG. 5 is a view showing a tip end portion side of the finger portion 21 from the direction of an arrow A in FIG. 4. Note that in FIGS. 4 and 5, a part of a second finger link portion 212 of the finger portion 21, to be described below, is depicted in a see-through state so that the internal structure of the second finger link portion 212 can also be seen.

As shown in FIGS. 2 and 4, each finger portion 21 includes a first finger link portion 211, the second finger link portion 212, and a base end portion 213. The base end portion 213 of the finger portion 21 is connected to the base portion 20. Here, as indicated by arrows in FIG. 3, the base end portion 213 is connected to the base portion 20 so as to be capable of rotating relative to the base portion 20 about a longitudinal direction (a perpendicular direction to the paper surface in FIG. 3) axis of the finger portion 21. Further, on the finger portion 21, one end of the second finger link portion 212 is connected to the base end portion 213. A second joint portion 23 is formed in a connecting portion between the second finger link portion 212 and the base end portion 213.

Here, a driving mechanism of the base end portion 213 and a driving mechanism of the second joint portion 23 will be described on the basis of FIG. 6. FIG. 6 is a view showing an internal structure of a part of the base portion 20 near a connecting portion connected to the finger portion 21 and internal structures of the base end portion 213 and the second joint portion 23 of the finger portion 21. As shown in FIG. 6, a gear 65, a gear 66, a second motor 52, and a third motor 53 are provided in the interior of the base portion 20. The gear 65 is a gear for rotating the entire finger portion 21 and is connected to a rotary shaft of the base end portion 213. The gear 66 is connected to a rotary shaft of the third motor 53. The gear 65 and the gear 66 are meshed to each other. With this configuration, when the third motor 53 rotates, resulting rotary force is transmitted to the rotary shaft of the base end portion 213 through the two gears 65, 66. As a result, the base end portion 213 is driven to rotate, and accordingly, the entire finger portion 21 is driven to rotate within the range indicated by the arrows in FIG. 3.

Further, a worm wheel 63 and a worm 64 meshed to the worm wheel 63 are provided in the interior of the second joint portion 23. The worm wheel 63 is connected to a rotary shaft of the second finger link portion 212 in the second joint portion 23. Furthermore, the worm 64 is connected to a rotary shaft of the second motor 52 provided in the interior of the base portion 20. With this configuration, when the second motor 52 is driven to rotate, resulting rotary force is transmitted to the rotary shaft of the second finger link portion 212 by the worm 64 and the worm wheel 63. As a result, the second finger link portion 212 is driven to rotate relative to the base end portion 213. Here, FIG. 7 is a view showing a movement range of the second joint portion 23 of the finger portion 21, realized by the driving force of the second motor 52. As shown in FIG. 7, the second joint portion 23 is formed to be capable of being bent and extended. Note that the driving force generated by the second motor 52 and the driving force generated by the third motor 53 are transmitted to the respective operation subjects thereof independently.

Further, as shown in FIGS. 4 and 5, in the finger portion 21, one end of the first finger link portion 211 is connected to the other end of the second finger link portion 212. A first joint portion 22 is formed in a connecting portion between the first finger link portion 211 and the second finger link portion 212. Here, a driving mechanism of the first joint portion 22 will be described on the basis of FIG. 8. FIG. 8 is a view showing internal structures of the first joint portion 22 and the second finger link portion 212 in the finger portion 21. Intermeshed bevel gears 61, 62 are provided in the interior of the first joint portion 22. One of the bevel gears 61 is connected to a rotary shaft of the first finger link portion 211 within the first joint portion 22. Further, the other bevel gear 62 is connected to a rotary shaft of a first motor 51 provided in the interior of the second finger link portion 212. With this configuration, when the first motor 51 is driven to rotate, resulting rotary force is transmitted to the rotary shaft of the first finger link portion 211 by the two bevel gears 61, 62. As a result, the first finger link portion 211 is driven to rotate relative to the second finger link portion 212. Here, FIG. 9 is a view showing a movement range of the first joint portion 22 of the finger portion 21, realized by the driving force of the first motor 51. As shown in FIG. 9, the first joint portion 22 is formed to be capable of being bent and extended.

Furthermore, as shown in FIGS. 2 and 4, in this embodiment, in the finger portion 21, the second finger link portion 212 on the base portion 20 side (the base end portion 213 side) of the first joint portion 22 is longer than the first finger link portion 211 on the tip end portion side of the first joint portion 22.

Moreover, as shown in FIGS. 2, 4, 5, and 10, in this embodiment, a pressure sensor 70 is provided on the tip end side of the first finger link portion 211 of the finger portion 21. The pressure sensor 70 is a sensor for detecting external force (pressure) acting on the tip end portion of the first finger link portion 211. Furthermore, as shown in FIG. 4, the pressure sensor 70 is provided on the first finger link portion 211 on both a wall surface (also referred to hereafter as a "bending-side wall surface") 215 on a bending direction side of the first joint portion 22 and a wall surface (also referred to hereafter as an "extension-side wall surface") 216 on an extension direction side of the first joint portion 22. Here, in this embodiment, the bending-side wall surface 215 on the tip end side of the first finger link portion 211 is formed in a curved surface shape. Accordingly, as shown in FIG. 10, a plurality of pressure sensors 70 may be arranged on the bending-side wall surface 215 on the tip end side of the first finger link portion 211 so as to extend along the curved surface shape thereof. Note that a sensor employing any known method, such as a piezoelectric sensor, a strain gauge, or an electrostatic capacitance sensor, may be used as the pressure sensor 70. Furthermore, in this embodiment, the pressure sensor 70 corresponds to "contact pressure detecting means" according to the present invention.

<Support Portion>

Next, configurations of an arm control device 42 and a hand control device 43 built into the support portion 4 will be described on the basis of FIG. 11. The arm control device 42 is a control device for controlling the arm mechanism 3 of the robot arm 1. The hand control device 43 is a control device for controlling the hand mechanism 2 of the robot arm 1. FIG. 11 is a block diagram showing respective function units included in the arm control device 42 and the hand control device 43.

The arm control device 42 is configured to include a plurality of drivers that generate drive signals for driving the motors provided in the respective joint portions of the arm mechanism 3, the drive signal from each driver being supplied to the corresponding motor. The arm control device 42 also includes a computer having a calculation processing device and a memory. The arm control device 42 further includes an arm control unit 420 and a motor state quantity acquisition unit 421 as function units. These function units are formed by having the computer included in the arm control device 42 execute a predetermined control program.

The arm control unit 420 controls the motors provided respectively in the joint portions 30a, 30b, 30c, 30d, 30e, 30f of the arm mechanism 3 by supplying the drive signals from the respective drivers thereto on the basis of object information acquired by an object information acquisition unit 430, to be described below, which serves as a function unit of the hand control device 43. The arm control unit 420 moves the arm mechanism 3 by controlling the respective motors, whereby the hand mechanism 2 is moved to a predetermined gripping position suitable for gripping an object. Further, each of the motors provided in the joint portions 30a, 30b, 30c, 30d, 30e, 30f of the arm mechanism 3 is provided with an encoder (not shown) for detecting state quantities (a rotation position and a rotation speed of the rotary shaft of the motor, and so on) relating to the rotation state of the corresponding motor. The state quantities of the motors, detected by the encoders of the respective motors, are input into the motor state quantity acquisition unit 421 of the arm control device 42. Then, on the basis of the state quantities of the respective motors, input into the motor state quantity acquisition unit 421, the arm control unit 420 servo-controls the respective motors so that the hand mechanism 2 moves to the predetermined gripping position, for example.

Further, the hand control device 43 is configured to include a plurality of drivers that generate drive signals for driving the motors provided in the hand mechanism 2, the drive signal from each driver being supplied to the corresponding motor. The hand control device 43 also includes a computer having a calculation processing device and a memory. The hand control device 43 further includes the object information acquisition unit 430, a hand control unit 431, a motor state quantity acquisition unit 432, and a sensor information acquisition unit 433 as function units. These function units are formed by having the computer included in the hand control device 43 execute a predetermined control program.

The object information acquisition unit 430 acquires object information, which is information relating to an object to be gripped by the hand mechanism 2. Here, the object information includes information relating to the shape, dimensions, and position of the object, information indicating the surrounding environment of the object (information relating to items other than the object existing on the periphery of the object, for example information relating to the shape of a container housing the object or a row of objects in the container), and so on. The object information acquisition unit 430 may also acquire object information input by a user. Further, when a visual sensor for capturing an image that includes the object is provided, the object information acquisition unit 430 may acquire object information from an image captured by the visual sensor.

Furthermore, the hand control unit 431 controls the first motors 51, the second motors 52, and the third motors 53 for driving the respective finger portions 21 of the hand mechanism 2 by supplying drive signals from the drivers thereto on the basis of the object information acquired by the object information acquisition unit 430. For example, the hand control unit 431 controls the first motors 51, the second motors 52, and the third motors 53 of the hand mechanism 2 so that the object is gripped by the hand mechanism 2, which has been moved to the predetermined gripping position by controlling the arm mechanism 3 using the arm control unit 420. Moreover, each first motor 51, each second motor 52, and each third motor 53 of the hand mechanism 2 is provided with an encoder (not shown) for detecting state quantities (the rotation position and rotation speed of the rotary shaft of the motor, and so on) relating to the rotation state of the corresponding motor. The state quantities of the motors 51, 52, 53, detected by the encoders of the motors 51, 52, 53, are input into the motor state quantity acquisition unit 432 of the hand control device 43. Then, on the basis of the state quantities of the motors 51, 52, 53, input into the motor state quantity acquisition unit 432, the hand control unit 431 servo-controls the motors 51, 52, 53 of the respective finger portions 21 so that the plurality of finger portions 21 grip the object, for example.

The hand control device 43 also includes the sensor information acquisition unit 433. Detection values from the pressure sensors 70 provided in the first finger link portion 211 of each finger portion 21 of the hand mechanism 2 are input into the sensor information acquisition unit 433. On the basis of the detection values from the pressure sensors 70, acquired by the sensor information acquisition unit 433, the hand control unit 431 can detect contact with the object by the finger portions 21, and on the basis of corresponding detection signals, the hand control unit 431 can also control the motors 51, 52, 53 of the finger portions 21.

<Functions of Finger Portion>

Next, functions of the respective finger portions 21 when the hand mechanism 2 grips an object will be described. Here, FIG. 12 is a view showing an example of the shape of an object 10 that is to be gripped by the hand mechanism 2. Further, FIG. 13 is a view showing a state in which a plurality of objects 10 (10') are arranged side by side. As shown in FIGS. 12 and 13, the object 10 is a rectangular parallelepiped having six surfaces (S1 to S6). Note, however, that the shape of the object 10 shown in FIG. 12 is merely an example, and the shape of the object to be gripped by the hand mechanism 2 is not limited to a rectangular parallelepiped.

Here, when the object 10 is to be gripped by the hand mechanism 2, at least two of the six surfaces of the object 10 are set as predetermined gripping surfaces (corresponding to predetermined gripping locations), and therefore one of the finger portions 21 of the hand mechanism 2 must be brought into contact with each of the predetermined gripping surfaces so that the object 10 is clamped by the finger portions 21. A case in which the object 10 is gripped after setting the two surfaces S5, S6 having the largest surface area, among the six surfaces of the object 10, as the predetermined gripping surfaces will be described below.

In a case where the object 10 is to be gripped by the hand mechanism 2 after setting the surfaces S5, S6 of the object 10 as the predetermined gripping surfaces, the surfaces S5, S6 must both be exposed so as to each be contactable by one of the finger portions 21 of the hand mechanism 2. As shown in FIG. 13, however, in a state where a plurality of objects 10 (10') that are to be gripped successively by the hand mechanism 2 are arranged side by side in mutual contact, the predetermined gripping surfaces of the object 10 may be disposed in contact with the adjacent object 10'. In the case of FIG. 13, one gripping surface S6 among the two predetermined gripping surfaces S5, S6 of the object 10 is in contact with the adjacent object 10'. In this case, the gripping surface S6 of the object 10 is not exposed. Therefore, when the object 10 remains in the state shown in FIG. 13, the finger portions 21 of the hand mechanism 2 cannot be brought into contact with the gripping surface S6 of the object 10, and as a result, the object 10 cannot be gripped by the hand mechanism 2.

Hence, in this embodiment, when the object 10 is to be gripped by the hand mechanism 2 in the conditions described above, the attitude of the object 10 is altered by one finger portion functioning as the state-altering finger portion, among the four finger portions 21 of the hand mechanism 2. The object 10 is then gripped by the three finger portions, among the four finger portions 21 of the hand mechanism 2, other than the finger portion functioning as the state-altering finger portion so that these finger portions function as the gripping finger portions.

Procedures implemented in this embodiment to grip the object 10 disposed in the state shown in FIG. 13 using the hand mechanism 2 will be described in detail below on the basis of FIGS. 14 to 17. Note that here, the finger portions 21 of the hand mechanism 2 will be referred to respectively as a first finger portion 21A, a second finger portion 21B, a third finger portion 21C, and a fourth finger portion 21D. Further, a case in which the first finger portion 21A is set as the finger portion functioning as the state-altering finger portion and the second to fourth finger portions 21B, 21C, 21C are set as the finger portions functioning as the gripping finger portions will be described below. FIGS. 14 and 15 are views showing an operation to alter the attitude of the object 10 using the first finger portion 21A of the hand mechanism 2. Further, FIGS. 16 and 17 are views showing a state in which the object 10 has been gripped by the second finger portion 21B, the third finger portion 21C, and the fourth finger portion 21D of the hand mechanism 2. The procedures to be described below, which are implemented by the hand mechanism 2 to grip the object 10, are realized by controlling the arm mechanism 3 with the arm control device 42 to move the hand mechanism 2 to a predetermined gripping position and then controlling the hand mechanism 2 with the hand control device 43.

As shown in FIG. 13, even when the object 10 is disposed in a state where the gripping surface S6 forms a contact surface that contacts the adjacent object 10', the upper surface S4 thereof is exposed. Therefore, the finger portions 21 of the hand mechanism 2 can be brought into contact with the upper surface S4 of the object 10. Hence, in this embodiment, as shown in FIG. 14, first, a first finger link portion 211A of the first finger portion 21A, which functions as the state-altering finger portion when the current object 10 is gripped, is brought into contact with the upper surface S4 of the object 10. Note that contact with the object 10 by the first finger link portion 211A of the first finger portion 21A can be detected by the pressure sensors 70 provided on the first finger link portion 211A. Further, at this time, in a state where the first finger portion 21A is in contact with the upper surface S4 of the object 10, the other finger portions 21B, 21C, 21D of the hand mechanism 2 do not contact the object 10.

Next, as shown in FIG. 15, in a state where the first finger link portion 211A of the first finger portion 21A is in contact with the upper surface S4 of the object 10, the object 10 is tilted forward by the first finger portion 21A. More specifically, the object 10 is tilted in a direction for separating the gripping surface S6 of the object 10 from the adjacent object 10'. By altering the attitude of the object 10 using the first finger portion 21A functioning as the state-altering finger portion in this manner, the interval between the object 10 and the adjacent object 10' can be enlarged. Accordingly, the gripping surface S6 of the object 10 can be exposed. As a result, the finger portions of the hand mechanism 2 other than the first finger portion 21A can be brought into contact not only with the other gripping surface S5 of the object 10 but also the gripping surface S6. Note that this state of the object 10, in which the finger portions 21 of the hand mechanism 2 can be brought into contact with both of the predetermined gripping surfaces S5, S6 of the object 10, will be referred to hereafter as a "predetermined grippable state".

Next, as shown in FIGS. 16 and 17, having set the attitude of the object 10 in the predetermined grippable state by tilting the object 10 using the first finger portion 21A, the object 10 is gripped by the second finger portion 21B, the third finger portion 21C, and the fourth finger portion 21D that function as the gripping finger portions when the current object 10 is gripped. At this time, in FIGS. 16 and 17, a first finger link portion 211B of the second finger portion 21B and a first finger link portion 211D of the fourth finger portion 21D are brought into contact with the gripping surface S6 of the object 10, which is exposed after altering the attitude of the object 10. Further, a first finger link portion 211C of the third finger portion 21C is brought into contact with the other gripping surface S5 of the object 10. Note, however, that it is not always necessary to bring two finger portions into contact with the gripping surface S6 of the object 10. In other words, the object 10 may also be gripped by bringing one finger portion into contact with the gripping surface S6 of the object 10 and bringing two finger portions into contact with the other gripping surface S5 of the object 10. Note that contact with the object 10 by the first finger link portion 211B of the second finger portion 21B, the first finger link portion 211C of the third finger portion 21C, and the first finger link portion 211D of the fourth finger portion 21D can be detected by the pressure sensors 70 provided on the respective first finger link portions 211B, 211C, 211D.

With the hand mechanism 2 according to this embodiment, as described above, even when the object 10 is disposed in contact with the adjacent object 10' so that the predetermined gripping surface of the object 10 is not exposed, meaning that if the object 10 remains in this state, the finger portions 21 of the hand mechanism 2 cannot be brought into contact with the predetermined gripping surface of the object 10, the attitude of the object 10 can be altered to the predetermined grippable state by causing one of the four finger portions 21 (in the example described above, the first finger portion 21A) to function as the state-altering finger portion. By altering the attitude of the object 10 to the predetermined grippable state using the finger portion functioning as the state-altering finger portion, the predetermined gripping surface of the object 10 that was in contact with the other object 10' can be exposed. As a result, the finger portions (in the example described above, the second finger portion 21B, the third finger portion 21C, and the fourth finger portion 21D) of the hand mechanism 2 other than the finger portion functioning as the state-altering finger portion, i.e. the finger portions that function as the gripping finger portions, can be brought into contact with the predetermined gripping surfaces of the object 10. The object 10 can thus be clamped by the three finger portions of the hand mechanism 2 that function as the gripping finger portions, and accordingly, the object 10 can be gripped.

Furthermore, the hand mechanism 2 according to this embodiment includes the four finger portions 21, and therefore, even in a state where the attitude of the object 10 has been altered by the single finger portion functioning as the state-altering finger portion, the object 10 can be gripped by causing the remaining three finger portions to function as the gripping finger portions. Note that the hand mechanism 2 according to this embodiment does not necessarily have to include the four finger portions 21. In other words, as long as the hand mechanism 2 includes at least three finger portions 21, the object 10 can be gripped by causing the two finger portions other than the single finger portion functioning as the state-altering finger portion to function as the gripping finger portions. On the other hand, when the hand mechanism 2 includes four finger portions 21, as described above, three finger portions 21 can be caused to function as the gripping finger portions while one of the finger portions 21 functions as the state-altering finger portion. By clamping the object 10 with three finger portions 21, as shown in FIGS. 16 and 17, momentum acting on the gripped object 10 can be suppressed. In other words, by causing three finger portions 21 to function as the gripping finger portions, the object 10 can be gripped in a more stable state.

Moreover, in the hand mechanism 2 according to this embodiment, the four finger portions 21 are disposed on the base portion 20 at equal angular intervals in a circumferential direction. The four finger portions 21 are all structured identically and have identical lengths. Accordingly, the four finger portions 21 are all capable of performing similar operations, and when a similar operation is implemented on the object 10, the finger portions 21 perform identical actions in relation to the object 10. In the hand mechanism 2, therefore, any of the four finger portions 21 is capable of functioning as either the state-altering finger portion or a gripping finger portion. In other words, although the first finger portion 21A functions as the state-altering finger portion in the above example, any one of the second finger portion 21B, the third finger portion 21C, and the fourth finger portion 21D can be caused to function as the state-altering finger portion instead, and the remaining finger portions, including the first finger portion 21A, can be caused to function as the gripping finger portions. Hence, when the object 10 is gripped by the gripping finger portions after the attitude of the object 10 has been altered to the predetermined grippable state by the state-altering finger portion, limitations in terms of the position and attitude of the hand mechanism 2 relative to the object 10 can be minimized.

Furthermore, with the hand mechanism 2 according to this embodiment, the object 10 can be gripped while altering the attitude of the object 10 to the predetermined grippable state using the single hand mechanism 2. As a result, a reduction in take time can be achieved in comparison with a case where, in contrast to this embodiment, the attitude of the object is altered to the predetermined grippable state using a separate device to the hand mechanism for gripping the object, whereupon the object is gripped by the hand mechanism.

Note that the finger portion, among the four finger portions 21 of the hand mechanism 2, to be caused to function as the state-altering finger portion and the finger portions to be caused to function as the gripping finger portions may either be selected as appropriate by the user or selected by the hand control unit 431 on the basis of the object information acquired by the object information acquisition unit 430.

Further, a configuration in which five or more finger portions 21 are provided may be employed in the hand mechanism 2 according to this embodiment. Likewise in this case, the five or more finger portions 21 may be disposed on the base portion 20 at equal angular intervals in the circumferential direction, and all of the finger portions 21 may be structured identically. Moreover, the five or more finger portions 21 may be configured so that each thereof can function as either the state-altering finger portion or a gripping finger portion.

Further, in this embodiment, contact with the object 10 by the tip end portions of the finger portions 21 must be detected by the pressure sensors 70 provided on the first finger link portions 211 of the finger portions 21 both when the attitude of the object 10 is altered to the predetermined grippable state by the state-altering finger portion and when the object 10 is gripped by the gripping finger portions. It is therefore necessary to ensure that the pressure sensor 70 contacts the object 10 reliably. Here, as described above, each finger portion 21 of the hand mechanism 2 is attached to the base portion 20 so as to be capable of rotating about the finger portion 21. Furthermore, the joint portions 22, 23 are formed in two locations on each finger portion 21. Moreover, the joint portions 22, 23 in the two locations are each formed to be capable of being bent and extended. By configuring the finger portion 21 in this manner, the degree of operational freedom in the entire finger portion 21 is comparatively high, and the movement range thereof is comparatively large. Hence, when the tip end portion of the finger portion 21 is brought into contact with the object 10, a contact angle (contact direction) can be adjusted as appropriate. As a result, the pressure sensor 70 provided on the first finger link portion 211 of the finger portion 21 can be brought into contact with the object 10 more reliably.

Note that joint portions do not necessarily have to be formed on the finger portion 21 in two locations, and a joint portion may be formed in a single location. By providing joint portions on the finger portion 21 in two locations, however, the degree of operational freedom and the movement range of the entire finger portion 21 can be increased in comparison with a case where a joint portion is provided in only one location. Joint portions may also be provided on the finger portion 21 in three or more locations.

Further, in the hand mechanism 2 according to this embodiment, the pressure sensor 70 is provided on both the bending-side wall surface 215 and the extension-side wall surface 216 of the first finger link portion 211 of each finger portion 21. With this configuration, contact with the object 10 can be detected by the pressure sensor 70 both when the bending-side wall surface 215 of the first finger link portion 211 contacts the object 10 and when the extension-side wall surface 216 of the first finger link portion 211 contacts the object 10. As a result, the finger portions 21 can be used to alter the attitude of the object 10 and grip the object 10 in a state where either the bending-side wall surface 215 or the extension-side wall surface 216 of the first finger link portion 211 of the finger portion 21 is in contact with the object 10.

Moreover, in the hand mechanism 2 according to this embodiment, as described above, the second finger link portion 212 of each finger portion 21 is longer than the first finger link portion 211. With this configuration, when an attempt is made to grip the object 10 using the gripping finger portions after inserting the tip end portions of the gripping finger portions into a space (a gap) that is formed between the object 10 and the adjacent object 10' when the attitude of the object 10 is altered, as shown in FIGS. 16 and 17, the first finger link portions 211 of the finger portions functioning as the gripping finger portions can be inserted into the space more easily. Moreover, when the object 10 is clamped by three finger portions 21 of the hand mechanism 2, pressing force can be applied to the object 10 by the finger portions 21 more stably than with a configuration in which the first finger link portion 211 is longer than the second finger link portion 212. As a result, the hand mechanism 2 can grip the object 10 more stably.

Note that in the above description, a case in which the object 10 is disposed in contact with the other object 10' so that a predetermined gripping surface of the object 10 is not exposed was described as an example. However, an item that may cause an obstruction when an attempt is made to bring the finger portions 21 of the hand mechanism 2 into contact with the predetermined gripping surfaces of the object 10 is not limited to the other object 10'. For example, when the object 10 is disposed in contact with a wall surface of a container housing the object 10 so that a predetermined gripping surface of the object 10 is not exposed, the wall surface of the container causes an obstruction. Likewise in this case, when the object 10 is to be gripped by the hand mechanism 2, the object 10 can be gripped by applying similar gripping procedures to those described above.

<Other Examples of Altering the State of the Object>

Here, the operation performed by the hand mechanism 2 according to this embodiment to set the state of the object in the predetermined grippable state when the object is to be gripped using the hand mechanism 2 is not limited to the operation shown in FIGS. 14 and 15. Other examples of the operation performed by the hand mechanism 2 to set the state of the object in the predetermined grippable state will be described below on the basis of FIGS. 18 to 21. FIGS. 18 and 19 are views showing a first other example of the operation of the hand mechanism 2, and FIGS. 20 and 21 are views showing a second other example of the operation of the hand mechanism 2.

In FIG. 18, a rectangular parallelepiped-shaped object 11 is disposed side by side and in contact with another object 11'. Further, on the object 11, a surface S5 contacting the other object 11' and a surface S6 on the opposite side to the surface S5 are set as the predetermined gripping surfaces. In other words, the gripping surface S5 of the object 11 is not exposed. Hence, in the state shown in FIG. 18, the finger portions 21 of the hand mechanism 2 cannot contact the gripping surface S5 of the object 11.

Likewise in a case such as that shown in FIG. 18, in order to grip the object 11 using the hand mechanism 2, the state of the object 11 must first be set in the predetermined grippable state. Likewise in this case, therefore, the attitude of the object 11 is altered using the first finger portion 21A, among the four finger portions 21 of the hand mechanism 2, as the state-altering finger portion. Note that in FIGS. 18 and 19, parts of the hand mechanism 2 other than the first finger portion 21A are not shown.

In FIG. 18, the first finger link portion 211A of the first finger portion 21A is brought into contact with the vicinity of an end portion of the upper surface S4 of the object 11 on the gripping surface S6 side. Then, by pressing the upper surface S4 of the object 11 as is using the first finger portion 21A, the object 11 is pivoted in a direction indicated by a black-outlined arrow. In so doing, as shown in FIG. 19, the gripping surface S5 side of the object 11 is raised such that the object 11 is tilted. As a result, the finger portions of the hand mechanism 2 that function as the gripping finger portions can contact not only the other gripping surface S6 of the object 11 but also the gripping surface S5. In other words, the state of the object 11 is set in the predetermined grippable state. Note that likewise when the attitude of the object 11 is altered in the manner shown in FIGS. 18 and 19, the finger portions other than the first finger portion 21A, among the four finger portions 21 of the hand mechanism 2, can also be used as the state-altering finger portion.

Further, in FIG. 20, a rectangular parallelepiped-shaped object 12 is disposed side by side and in contact with another object 12'. Furthermore, on the object 12, a surface S5 contacting the other object 12' and a surface S6 on the opposite side to the surface S5 are set as the predetermined gripping surfaces. In other words, in the state shown in FIG. 20, the finger portions 21 of the hand mechanism 2 cannot contact the gripping surface S5 of the object 12.

Hence, in this case, the position of the object 12 is altered using the first finger portion 21A, among the four finger portions 21 of the hand mechanism 2, as the state-altering finger portion. Note that in FIGS. 20 and 21, parts of the hand mechanism 2 other than the first finger portion 21A are not shown.

In FIG. 20, the first finger link portion 211A of the first finger portion 21A is brought into contact with an upper part of the other gripping surface S6 of the object 12. Then, by pressing the other gripping surface S6 of the object 12 as is using the first finger portion 21A, the position of the object 12 is shifted by the first finger portion 21A in a direction indicated by a black-outlined arrow while pressing the object 12 against the object 12'. In so doing, as shown in FIG. 21, the position of the object 12 is moved upward so that the object 12 projects above the height of the upper surface S4 of the object 12'. In other words, the upper part of the gripping surface S5 of the object 12 is exposed. Thus, the finger portions of the hand mechanism 2 that function as the gripping finger portions can contact not only the other gripping surface S6 of the object 12 but also the gripping surface S5. In other words, the state of the object 12 is set in the predetermined grippable state. Note that likewise in the case shown in FIGS. 20 and 21, the finger portions other than the first finger portion 21A, among the four finger portions 21 of the hand mechanism 2, can also be used as the state-altering finger portion.

As described above using FIGS. 18 to 21, in the hand mechanism 2 according to this embodiment, the four finger portions 21 are configured to have a comparatively high degree of operational freedom and a comparatively large movement range, and therefore the state of the object can be altered to the predetermined grippable state by means of various operations using the finger portion functioning as the state-altering finger portion. Moreover, the object set in the predetermined grippable state by means of these operations can be gripped using the finger portions functioning as the gripping finger portions.

<Control Flow>

Next, a control flow executed when an object is gripped by the hand mechanism 2 will be described on the basis of a flowchart shown in FIG. 22. This control flow is realized by executing a predetermined control program in the arm control device 42 and the hand control device 43. In this flow, first, in S101, the object information acquisition unit 430 acquires object information relating to an object serving as a current gripping subject.

Next, in S102, the finger portion selected as the state-altering finger portion, among the four finger portions 21 of the hand mechanism 2, is brought into contact with the object. At this time, a wall surface of the object with which the finger portions can be brought into contact in the current state of the object is selected on the basis of the object information acquired in S101 by the object information acquisition unit 430, and the state-altering finger portion is brought into contact with the selected wall surface of the object. Next, in S103, the state of the object is altered to the predetermined grippable state by altering the attitude and/or the position of the object using the state-altering finger portion that has been brought into contact with the object. Next, in S104, the object set in the predetermined grippable state by executing the processing of S103 is gripped by the finger portions, among the four finger portions 21 of the hand mechanism 2, other than the state-altering finger portion, i.e. the finger portions selected as the gripping finger portions. At this time, the object is gripped by the gripping finger portions of the hand mechanism 2 by bringing the gripping finger portions into contact with the predetermined gripping surfaces of the object.

By executing the respective steps of the control flow described above using the arm control device 42 and the hand control device 43, the object can be gripped by the hand mechanism 2 regardless of the attitude and the surrounding conditions of the object.

Note that with the hand mechanism 2 according to this embodiment, when the object is disposed in a state where all of the predetermined gripping surfaces are exposed so as to be contactable by the finger portions 21 of the hand mechanism 2, it is of course possible to bring the finger portions 21 into contact with the predetermined gripping surfaces and grip the object without altering the state of the object. Moreover, in this case, all four of the finger portions 21 can be used as the gripping finger portions, whereby the object can be gripped by clamping the object with the four finger portions 21.

<Modified Examples of Hand Mechanism>

As described above, the worm wheel 63 and the worm 64 meshed to the worm wheel 63 are provided in the interior of the second joint portion 23 as a screw mechanism. Further, the worm wheel 63 is connected to the rotary shaft of the second finger link portion 212 within the second joint portion 23, while the worm 64 is connected to the rotary shaft of the second motor 52 provided in the interior of the base portion 20. With this configuration, when the second motor 52 is driven to rotate, the rotary force thereof is transmitted to the rotary shaft of the second finger link portion 212 by the worm 64 and the worm wheel 63. As a result, the second finger link portion 212 is driven to rotate relative to the base end portion 213.

A stopper for physically limiting rotation of the second finger link portion 212 is provided at each end position of the movement range shown in FIG. 7, i.e. the movement range within which the second joint portion 23 is caused to bend and extend by the driving force of the second motor 52. FIG. 23 is a schematic view showing configurations of stoppers 230. The stoppers 230 are configured to include a first stopper 231 provided on the base end portion 213, a second stopper 232 provided on the second finger link portion 212, and a third stopper 233 provided on the base end portion 213.

The first stopper 231 is provided on an outer peripheral surface 631 of the base end portion 213 so as to project from the outer peripheral surface 631, the outer peripheral surface 631 covering the outside of the worm wheel 63 and being formed to center on the rotary shaft of the second finger link portion 212. A central axis of the outer peripheral surface 631 is aligned with a central axis of the worm wheel 63. Further, the second stopper 232 is provided on a side face of the second finger link portion 212 that is oriented in an advancement direction when the second joint portion 23 extends. Furthermore, the second stopper 232 is provided in a location that rotates around the outer peripheral surface 631 of the base end portion 213 while remaining apart from the outer peripheral surface 631 when the second joint portion 23 extends. A distance between the second stopper 232 and the outer peripheral surface 631 is smaller than an amount by which the first stopper 231 projects from the outer peripheral surface 631. The second stopper 232 is fixed to the second finger link portion 212 using a bolt 234. Note that the first stopper 231 may be fixed to the outer peripheral surface 631 of the base end portion 213 by welding or a bolt or may be formed on the outer peripheral surface 631.

FIG. 24 is a sectional view of the vicinity of the second joint portion 23 when the second joint portion 23 is maximally extended. Since the distance between the second stopper 232 and the outer peripheral surface 631 is smaller than the amount by which the first stopper 231 projects from the outer peripheral surface 631, a first butting portion 2321 of the second stopper 232 butts the first stopper 231 when the second joint portion 23 is maximally extended. The first butting portion 2321 is a surface formed on an end portion of the second stopper 232 on the base end portion 213 side in the axial direction of the second finger link portion 212, this surface being orthogonal to the axial direction of the second finger link portion 212. The first butting portion 2321 is formed in a shape that corresponds to the shape of the first stopper 231 so that when the second joint portion 23 is maximally extended, a plane on the first contact portion 2321 and a plane on the first stopper 231 become parallel and butt each other. As a result, the first stopper 231 applies a physical limitation preventing the second joint portion 23 from extending further. By removing the bolt 234 in a state where the second stopper 232 butts the first stopper 231, the second stopper 232 becomes able to move in an axial direction of the bolt 234.

FIG. 25, meanwhile, is a sectional view of the vicinity of the second joint portion 23 when the second joint portion 23 is maximally bent. When the second joint portion 23 is maximally bent, a second butting portion 2322 of the second stopper 232, which is different to the first butting portion 2321, butts an outer surface 632 of the base end portion 213. The outer surface 632 is a top surface of the base end portion 213 projecting from the base portion 20, and is formed on a tangent of the outer peripheral surface 631 so as to be parallel with a top surface of the base portion 20. Note that the outer surface 632 butted by the second stopper 232 serves as the third stopper 233. When the second joint portion 23 is extended, the distance between the second stopper 232 and the outer peripheral surface 631 is maintained at a fixed distance, but when the second joint portion 23 is bent, the distance between the second stopper 232 and the outer surface 632 shortens as the angle of the bend increases. When the second joint portion 23 is maximally bent, the second butting portion 2322 of the second stopper 232 butts the third stopper 233. The second butting portion 2322 is a surface that is formed to face the central axis side of the second finger link portion 212 and inclined relative to the axial direction of the second finger link portion 212. The second butting portion 2322 is formed in a shape that corresponds to the shape of the third stopper 233 so that when the second joint portion 23 is maximally bent, a plane on the second butting portion 2322 and a plane on the third stopper 233 become parallel and butt each other. As a result, the third stopper 233 applies a physical limitation preventing the second joint portion 23 from bending further. By removing the bolt 234 in a state where the second stopper 232 butts the third stopper 233, the second stopper 232 becomes able to move in the axial direction of the bolt 234.

Hence, the stoppers 230 are formed so that when the second joint portion 23 is maximally extended, the second stopper 232 butts the first stopper 231, and when the second joint portion 23 is maximally bent, the second stopper 232 butts the third stopper 233. Using the stoppers 230, the extension and bending movement ranges of the second joint portion 23 can be limited. Note that normally, in the hand mechanism 2, the second stopper 232 is controlled by the hand control device 43 so as not to butt the first stopper 231 and the third stopper 233. The hand control device 43 stores a reference position, which is the position of the second joint portion 23 when neither bent nor extended, and controls the second motor 52 so that the second finger link portion 212 rotates from the reference position by a rotation angle at which the second stopper 232 does not butt either the first stopper 231 or the third stopper 233.

However, the reference position of the second finger link portion 212 may be deleted from the memory when a power supply of the hand control device 43 is cut off or the like, and when the hand mechanism 2 is used over a long period, the actual reference position may deviate from the stored reference position. In such cases, the second stopper 232 may butt the first stopper 231 or the third stopper 233. When driving force is supplied to the worm 64 in a state where the second stopper 232 butts the first stopper 231 or the third stopper 233, a load on a contact part between the worm 64 and the worm wheel 63 increases, leading to an increase in frictional force. It may therefore be difficult to rotate the worm 64 in a reverse direction, and as a result, the second joint portion 23 may enter a locked state, making it difficult to bend or extend the second joint portion 23.

The second stopper 232 according to this embodiment, however, is configured to be movable. More specifically, the second stopper 232 can be detached (i.e. moved) by removing the bolt 234 fixing the second stopper 232. By moving the second stopper 232 when the second joint portion 23 is locked, the second stopper 232 no longer butts the first stopper 231 or the third stopper 233. Thus, the load on the contact part between the worm 64 and the worm wheel 63 decreases, leading to a reduction in frictional force, and as a result, the worm 64 can be rotated in a direction for releasing the lock. The lock on the second joint portion 23 can thus be released. After releasing the lock, the second stopper 232 is reattached to the second finger link portion 212 using the bolt 234.

Note that the shape of the stopper 230 is not limited to the shape described above, and as long as relative rotation of the second finger link portion 212 relative to the base end portion 213 is physically limited on both the bending side and the extension side of the second joint portion 23, any shape may be used. Moreover, in this embodiment, the single second stopper 232 physically limits rotation of the second finger link portion 212 on both the bending side and the extension side of the second joint portion 23, but instead, two stoppers for separately limiting rotation of the second link portion 212 on the bending side and the extension side may be provided on the second finger link portion 212 and respectively configured to be movable. In other words, different stoppers may respectively butt the first stopper 231 and the third stopper 233. Furthermore, in this embodiment, the second stopper 232 is configured to be movable, but instead, the first stopper 231 and the third stopper 233 may be configured to be movable. Alternatively, all of the stoppers 230 may be configured to be movable. Further, in the above description, rotation of the second finger link portion 212 is physically limited on both the bending side and the extension side, but rotation of the second finger link portion 212 may be physically limited on only one of the bending side and the extension side. In other words, either the first stopper 231 or the third stopper 233 may be omitted.

Furthermore, in this embodiment, the second stopper 232 becomes movable when the bolt 234 fixing the second stopper 232 is removed, but the structure for making the second stopper 232 movable is not limited thereto. For example, the second stopper 232 may move by rotating or by advancing and retreating. Moreover, the second stopper 232 is not limited to being fixed by the bolt 234, and another known fixing method may be used.

Note that the stoppers 230 described above may also be applied to the hand mechanism in a case where the attitude and/or the position of the object is not altered when gripping the object. Further, the stoppers 230 described above are provided on the second joint portion 23, but when rotation is performed in another joint portion using a worm and a worm wheel, stoppers may be provided on that joint portion. Furthermore, the worm wheel 63 and the worm 64 were cited as an example of a screw mechanism, but as long as the screw mechanism is a self-locking mechanism, a mechanism other than the worm wheel 63 and the worm 64 may be applied.

REFERENCE SIGNS LIST

1 Robot arm
2 Hand mechanism
20 Base portion
21 Finger portion
22 First joint portion
23 Second joint portion
211 First finger link portion
212 Second finger link portion
213 Base end portion
3 Arm mechanism
30a First joint portion
30b Second joint portion
30c Third joint portion
30d Fourth joint portion
30e Fifth joint portion
30f Sixth joint portion
31 First arm link portion
32 Second arm link portion
33 Third arm link portion
34 Fourth arm link portion
35 Fifth arm link portion
36 Connecting member 4 Support portion
42 Arm control device
420 Arm control unit
421 Motor state quantity acquisition unit
43 Hand control device
430 Object information acquisition unit
431 Hand control unit
432 Motor state quantity acquisition unit
433 Sensor information acquisition unit
51 First motor
52 Second motor
53 Third motor
61, 62 Bevel gears
63 Worm wheel
64 Worm
65, 66 Gears
70 Pressure sensor

The invention claimed is:

1. A hand mechanism comprising three or more finger portions, wherein,
when an object is to be gripped, at least one finger portion among the three or more finger portions functions as a state-altering finger portion for altering the attitude and/or the position of the object while contacting the object, and at least two finger portions among the finger portions other than the finger portion functioning as the state-altering finger portion function as gripping finger portions for gripping the object in a state where the attitude and/or the position has been altered by the state-altering finger portion;
the state-altering finger portion includes a joint portion that is bendable and extendable; and
a first finger link portion on a tip end portion side of the joint portion of the state-altering finger portion is configured to alter the attitude and/or the position of the object by bending or extending with respect to a second finger link portion on a base portion side of the joint portion of the state-altering finger portion,
wherein the first finger link portion includes contact pressure detection means on a surface in a direction of bending and a surface in a direction of extending with respect to the second finger link portion.

2. The hand mechanism according to claim 1, wherein all of the three or more finger portions are configured to be capable of functioning as both the state-altering finger portion and the gripping finger portion.

3. The hand mechanism according to claim 2, further comprising a base portion, wherein
the three or more finger portions are disposed on the base portion at equal angular intervals in a circumferential direction, and all of the three or more finger portions have identical structures.

4. The hand mechanism according to claim 3, wherein all of the three or more finger portions have substantially equal lengths.

5. The hand mechanism according to claim 1, wherein
four or more finger portions are provided, and
when the object is to be gripped, at least three finger portions among the finger portions other than the finger portion functioning as the state-altering finger portion function as the gripping finger portions.

6. The hand mechanism according to claim 1, wherein
at least one finger portion among the three or more finger portions is a rotatable finger portion provided to be capable of rotating about itself,
the rotatable finger portion includes a joint portion that is bendable and extendable, and
contact pressure detecting means is provided on a tip end portion of the rotatable finger portion.

7. The hand mechanism according to claim 6, wherein the contact pressure detecting means is provided on a plurality of wall surfaces or a surrounding wall surface on the tip end portion of the rotatable finger portion.

8. The hand mechanism according to claim 6, wherein the joint portion is provided in two or more locations on the rotatable finger portion.

9. The hand mechanism according to claim 1, wherein
at least one finger portion among the three or more finger portions is a rotatable finger portion provided to be capable of rotating about itself,
the rotatable finger portion includes a joint portion that is bendable and extendable, and
a second finger link portion on a base portion side of the joint portion of the rotatable finger portion is longer than a first finger link portion on a tip end portion side of the joint portion of the rotatable finger portion.

10. A gripping system comprising:
the hand mechanism according to claim 1; and
a control device for controlling the hand mechanism when the object is gripped by the hand mechanism, wherein,
when the object is to be gripped by the hand mechanism, the control device brings the finger portion selected as the state-altering finger portion, among the three or more finger portions of the hand mechanism, into contact with the object, sets the object in a predetermined grippable state by altering the attitude and/or the position of the object using the finger portion selected as the state-altering finger portion, and causes the finger portions selected as the gripping finger portions, among the three or more finger portions of the hand mechanism, to grip the object set in the predetermined grippable state.

11. A non-transitory storage medium stored with a gripping program for causing a control device for controlling the hand mechanism according to claim 1 to execute the steps of:
bringing the finger portion selected as the state-altering finger portion, among the three or more finger portions of the hand mechanism, into contact with the object;
setting the object in a predetermined grippable state by altering the attitude and/or the position of the object using the state-altering finger portion brought into contact with the object; and
causing the finger portions selected as the gripping finger portions, among the three or more finger portions of the hand mechanism, to grip the object set in the predetermined grippable state.

12. A hand mechanism comprising a finger portion,
the finger portion including:
a joint portion that is bendable and extendable using a screw mechanism; and
a stopper for limiting a range in which the joint portion is bendable and extendable, wherein
the stopper is detachable,
the screw mechanism includes a worm and a worm wheel,
the finger portion includes:
a base end portion; and
a finger link portion that is connected to the base end portion at the joint portion and rotates relative to the base end portion about the worm wheel in response to bending and extension of the joint portion, the stopper includes a first stopper provided on the base end portion, a second stopper provided on the finger link portion, and a third stopper provided on the base end portion, when the joint portion is maximally extended, the first stopper and the second stopper butt each other, whereby the extendable range of the joint portion is limited, when the joint portion is maximally bent, the third stopper and the second stopper butt each other, whereby the bendable range of the joint portion is limited, and on the second stopper, a location that butts the first stopper is different to a location that butts the third stopper.

* * * * *